(12) United States Patent
M. et al.

(10) Patent No.: US 12,469,039 B2
(45) Date of Patent: Nov. 11, 2025

(54) SYSTEMS AND METHODS FOR FACILITATING BUSINESS PROSPECTING IN A TIERED SOFTWARE FRAMEWORK

(71) Applicant: HighLevel Inc., Dallas, TX (US)

(72) Inventors: Reshma Kris M., Madurai (IN); Pranoy Sarkar, Sonitpur (IN); William Chase Buckner, Doylestown, PA (US); Aaditya Agarwal, Gurugram (IN); Shaun Clark, Eugene, OR (US); Robin Alex, Dallas, TX (US); Varun Vairavan, Doha (QA)

(73) Assignee: HighLevel Inc.

( * ) Notice: Subject to any disclaimer, the term of this patent is extended or adjusted under 35 U.S.C. 154(b) by 147 days.

(21) Appl. No.: 18/469,702

(22) Filed: Sep. 19, 2023

(65) Prior Publication Data
US 2025/0095011 A1    Mar. 20, 2025

(51) Int. Cl.
*G06Q 30/0204* (2023.01)
*G06F 3/0482* (2013.01)
*G06F 3/04817* (2022.01)

(52) U.S. Cl.
CPC ..... G06Q 30/0205 (2013.01); *G06F 3/04817* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 9,087,035 B1* | 7/2015 | Bandaru | G06F 40/186 |
| 9,621,729 B2* | 4/2017 | Spievak | G06Q 50/01 |
| 9,721,266 B2* | 8/2017 | Riazzi | G06Q 30/02 |
| 2009/0106081 A1* | 4/2009 | Burgess | G06Q 30/0277 |
| | | | 705/14.73 |
| 2011/0258049 A1* | 10/2011 | Ramer | G06Q 30/0273 |
| | | | 705/14.69 |
| 2012/0323695 A1* | 12/2012 | Stibel | G06Q 30/02 |
| | | | 705/14.66 |
| 2014/0278955 A1* | 9/2014 | Nygaard | G06Q 30/0251 |
| | | | 705/14.49 |
| 2017/0068420 A1* | 3/2017 | Hsueh | G06F 3/0482 |
| 2017/0178199 A1* | 6/2017 | Cessna | G06Q 30/0271 |
| 2018/0204111 A1* | 7/2018 | Zadeh | G06V 10/764 |

(Continued)

OTHER PUBLICATIONS

R. Lawrence et al., "Analytics-driven solutions for customer targeting and sales-force allocation," in IBM Systems Journal, vol. 46, No. 4, pp. 797-816, 2007, doi: 10.1147/sj.464.0797. (Year: 2007).*

*Primary Examiner* — Stephanie Z Delich
(74) *Attorney, Agent, or Firm* — Aambell PC

(57) ABSTRACT

Embodiments of a method for facilitating business prospecting in a tiered software framework include receiving third-party data associated with prospects in a geographic location; analyzing the third-party data of each prospect against a plurality of criteria; reducing a portion of the analysis results to numerical values represented by icons; listing, in a first window of a user interface, the prospects in rows with corresponding icons in columns; and responsive to a selection of one of the rows, automatically opening a second window including another portion of the analysis results, the another portion including results from the analysis against the plurality of criteria.

20 Claims, 11 Drawing Sheets

(56) References Cited

U.S. PATENT DOCUMENTS

| | | | |
|---|---|---|---|
| 2018/0276194 A1* | 9/2018 | Padgett | G06F 40/103 |
| 2018/0300748 A1* | 10/2018 | Flaks | G06Q 30/0243 |
| 2019/0034976 A1* | 1/2019 | Hamedi | G06Q 30/0243 |
| 2019/0228083 A1* | 7/2019 | Yim | H04L 67/1031 |
| 2022/0188698 A1* | 6/2022 | Halecky | G06Q 30/0613 |

* cited by examiner

SYSTEMS AND METHODS FOR FACILITATING BUSINESS PROSPECTING IN A TIERED SOFTWARE FRAMEWORK

TECHNICAL FIELD

The present disclosure relates to systems, techniques, and methods directed to systems and methods for facilitating business prospecting in a tiered software framework.

BACKGROUND

Cloud computing services include storage, network, and computing, facilitating various service models, such as infrastructure as a service (IaaS), platform as a service (PaaS) and software as a service (SaaS). Software applications running on the cloud are being increasingly used to support various business operations, including marketing. In this regard, some SaaS applications focus on business prospecting, which is a process of identifying and reaching out to potential customers who are likely to be interested in a company's products or services. Business prospecting is a crucial part of marketing strategies, because it helps businesses expand their customer base and generate new leads for potential sales opportunities.

BRIEF DESCRIPTION OF THE DRAWINGS

Embodiments will be readily understood by the following detailed description in conjunction with the accompanying drawings. To facilitate this description, like reference numerals designate like elements. Embodiments are illustrated by way of example, and not by way of limitation, in the figures of the accompanying drawings.

DETAILED DESCRIPTION

Overview

Figure 1:
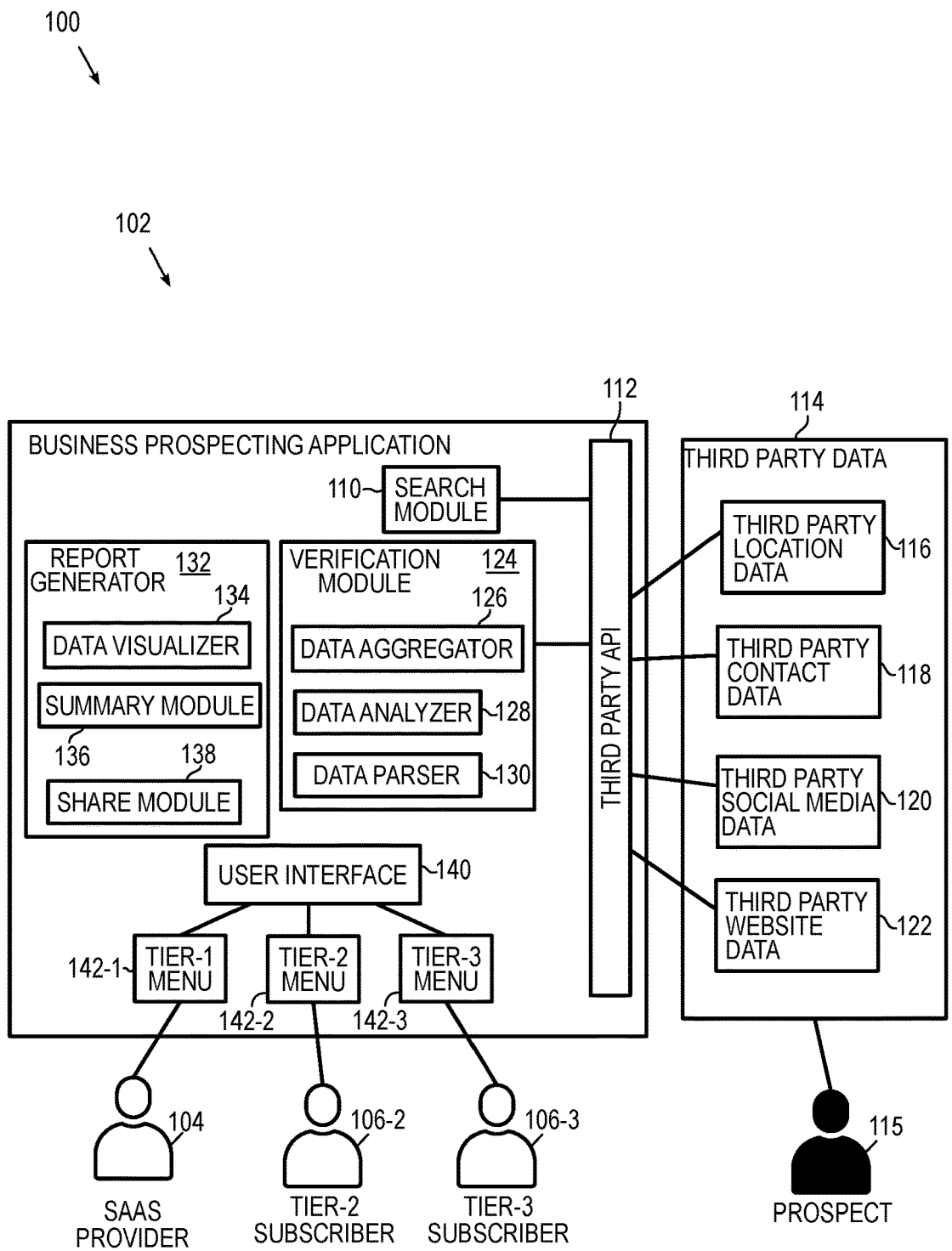
FIG. 1 is a simplified block diagram illustrating an example business prospecting application for facilitating business prospecting in a tiered software framework, according to some embodiments of the present disclosure.

For purposes of illustrating the embodiments described herein, it is important to understand certain terminology and operations of technology networks. The following foundational information may be viewed as a basis from which the present disclosure may be properly explained. Such information is offered for purposes of explanation only and, accordingly, should not be construed in any way to limit the broad scope of the present disclosure and its potential applications.

Business prospecting aims to create a pipeline of potential customers who are in the market for what the business offers. This involves researching and identifying individuals or organizations that match the target demographic and have a genuine need or interest in the products or services being offered. Typical business prospecting processes involve the following steps: research, segmentation, lead generation, outreach, qualification, nurturing, negotiation, sales, and follow-up. Research involves gathering information about potential customers, including their needs, preferences, industry, and any relevant data that can help tailor the sales approach. Prospects are often grouped into segments based on shared characteristics, such as industry, location, company size, or buying behavior. This segmentation helps in creating personalized and effective outreach strategies. Using various methods such as online research, social media, networking events, trade shows, and referrals, businesses collect contact information (e.g., email addresses, phone numbers, etc.) of potential prospects. They then initiate contact with the prospects through methods like cold calling, cold emailing, or connecting on social media platforms. The initial outreach aims to pique their interest and start a conversation.

Some businesses may include a qualification step to determine whether a prospect meets certain criteria that indicate they are genuinely interested and likely to make a purchase. For prospects who show potential but might not be ready to buy immediately, businesses engage in lead nurturing. This involves maintaining regular communication to build relationships, provide valuable information, and address any concerns. When a prospect is deemed qualified and interested, a formal sales presentation might be conducted to showcase the benefits and features of the product or service. A sale may be closed after discussing terms, pricing, and other considerations. Even after the sale, maintaining a positive relationship with the customer is important. This can lead to repeat business, referrals, and potentially upselling or cross-selling opportunities. In general, effective business prospecting requires a deep understanding of the target audience, strong communication skills, and the ability to tailor the sales approach to each prospect's unique needs and preferences. It is an ongoing process, heavily manual, and one that plays a crucial role in a company's growth and success. Such manual processes are time-consuming and often yields inconsistent results.

Various types of software applications to support these business prospecting functions are available. Some of the features of such software include: automatically searching the internet, databases, and social media platforms to find relevant leads based on criteria such as industry, location, company size, job titles, and more; mining additional information about leads, such as contact details, company information, and social media profiles from publicly available data; categorizing and prioritizing leads based on predefined criteria; automating email campaigns, personalized messaging, and follow-up sequences to enable consistent communication with prospects and moving them through the sales funnel; providing insights into the effectiveness of different prospecting strategies; integrating seamlessly with Customer Relationship Management (CRM) systems; monitoring social media platforms for relevant conversations, allowing businesses to engage with potential leads and establish connections; and performing data analytics to identify leads with the highest likelihood of converting, based on historical data and patterns. Not all software applications provide all features; some focus on certain aspects, such as lead generation; others on certain other aspects such as automating email campaigns; and yet others on other aspects such as data analytics.

Standalone business prospecting applications owned by a single company may use only information of that company for performing data analytics. Hence the data analytics on such information, while highly relevant, is limited to the extent that no external information can be utilized, for example, to facilitate an "out-of-the-box" approach. In cloud applications that are provided to different customers, data privacy contracts may prevent the cloud application from allowing use of one company's data by another company.

In contrast, embodiments disclosed herein include receiving third-party data associated with prospects in a geographic location; analyzing the third-party data of each prospect against a plurality of criteria; reducing a portion of the analysis results to numerical values represented by icons; listing, in a first window of a user interface, the prospects in rows with corresponding icons in columns; and responsive to a selection of one of the rows, automatically opening a second window including another portion of the analysis results, the another portion including results from the analysis against the plurality of criteria.

In the following detailed description, various aspects of the illustrative implementations may be described using terms commonly employed by those skilled in the art to convey the substance of their work to others skilled in the art.

The term "connected" means a direct connection (which may be one or more of a communication, mechanical, and/or electrical connection) between the things that are connected, without any intermediary devices, while the term "coupled" means either a direct connection between the things that are connected, or an indirect connection through one or more passive or active intermediary devices.

The term "computing device" means a server, a desktop computer, a laptop computer, a smartphone, or any device with a microprocessor, such as a central processing unit (CPU), general processing unit (GPU), or other such electronic component capable of executing processes of a software algorithm (such as a software program, code, application, macro, etc.).

The term "cloud network" means a network of computing devices coupled together in a public, private, or hybrid communications network. Communication in the cloud network may use one or more wired, wireless, broadband, radio, and other kinds of communicative means. The Internet is an example of a cloud network.

As used herein, the term "application" can be inclusive of an executable file comprising instructions that can be understood and processed on a computing device such as a computer, and may further include library modules loaded during execution, object files, system files, hardware logic, software logic, or any other executable modules. Applications are generally configured to perform particular tasks, or functions according to the type of application.

The description uses the phrases "in an embodiment" or "in embodiments," which may each refer to one or more of the same or different embodiments.

Although certain elements may be referred to in the singular herein, such elements may include multiple sub-elements. For example, "a computing device" may include one or more computing devices.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

The accompanying drawings are not necessarily drawn to scale. In the drawings, same reference numerals refer to the same or analogous elements shown so that, unless stated otherwise, explanations of an element with a given reference numeral provided in context of one of the drawings are applicable to other drawings where element with the same reference numerals may be illustrated. Further, the singular and plural forms of the labels may be used with reference numerals to denote a single one and multiple ones respectively of the same or analogous type, species, or class of element.

Note that in the figures, various components are shown as aligned, adjacent, or physically proximate merely for ease of illustration; in actuality, some or all of them may be spatially distant from each other. In addition, there may be other components, such as routers, switches, antennas, communication devices, etc. in the networks disclosed that are not shown in the figures to prevent cluttering. Systems and networks described herein may include, in addition to the elements described, other components and services, including network management and access software, connectivity services, routing services, firewall services, load balancing services, content delivery networks, virtual private networks, etc. Further, the figures are intended to show relative arrangements of the components within their systems, and, in general, such systems may include other components that are not illustrated (e.g., various electronic components related to communications functionality, electrical connectivity, etc.).

In the drawings, a particular number and arrangement of structures and components are presented for illustrative purposes and any desired number or arrangement of such structures and components may be present in various embodiments. Further, unless otherwise specified, the structures shown in the figures may take any suitable form or shape according to various design considerations, manufacturing processes, and other criteria beyond the scope of the present disclosure.

Figure 11:
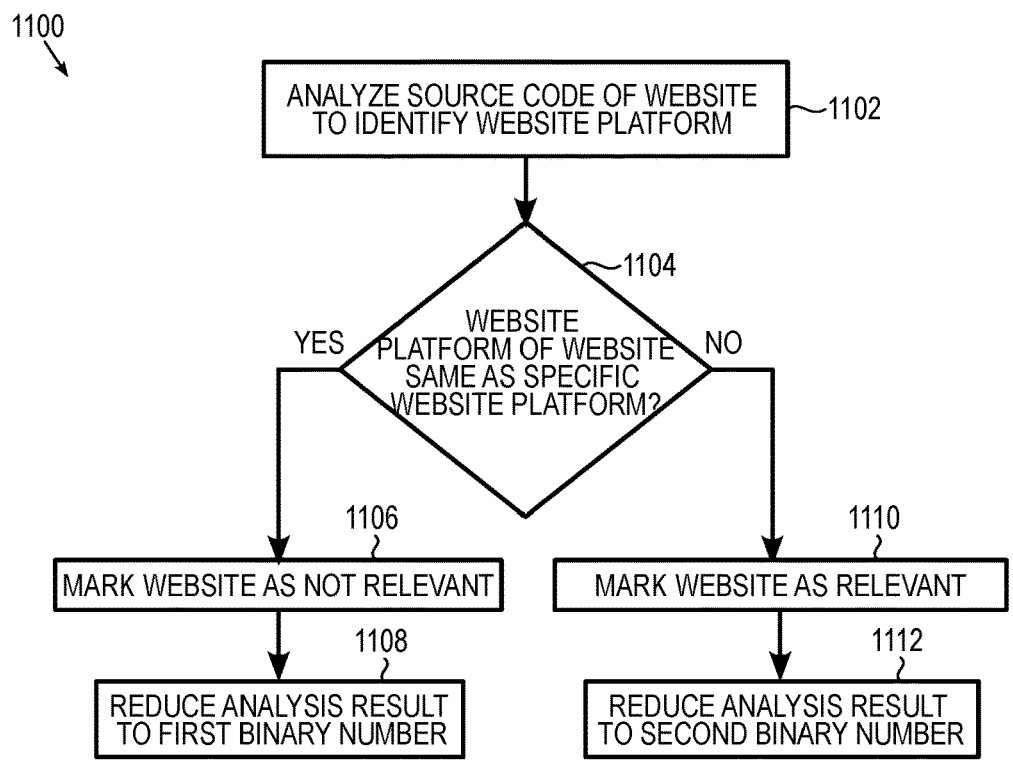
FIG. 11 is a simplified flow diagram illustrating yet other example operations associated with the business prospecting application, according to some embodiments of the present disclosure.

For convenience, if a collection of drawings designated with different letters are present (e.g., FIGS. 11A-11G), such a collection may be referred to herein without the letters (e.g., as "FIG. 11"). Similarly, if a collection of reference numerals designated with different letters are present (e.g., 106a, 106b), such a collection may be referred to herein without the letters (e.g., as "106") and individual ones in the collection may be referred to herein with the letters. Further, labels in upper case in the figures (e.g., 106A) may be written using lower case in the description herein (e.g., 106a) and should be construed as referring to the same elements.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

EXAMPLE EMBODIMENTS

FIG. 1 is a simplified block diagram illustrating an example business prospecting application 100 according to embodiments of the present disclosure. Business prospecting application 100 may comprise various tiers 102. In the example embodiment shown, business prospecting application 100 has three tiers: 102-1, 102-2, and 102-3. Note that the labeling convention followed herein uses the hyphen followed by a number to denote a separate tier corresponding to the number (e.g., "-1" denotes tier-1, "-2" denotes tier-2, and "-3" denotes tier-3). Business prospecting application 100 may be managed by a SaaS provider 104, who may provide one or more downstream subscriber 106-2 at tier 102-2 with access to business prospecting application 100. In turn, subscriber 106-2 may provide one or more downstream subscriber 106-3 at tier 102-3 with access to certain features of business prospecting application 100. SaaS provider 104 and subscribers 106 (e.g., 106-2 and 106-2) may include an entity (i.e., a company, an organization, etc.) in various embodiments. Human users at SaaS provider 104, and subscribers 106 may operate or otherwise use business prospecting application 100 through one or more devices such as computers, laptops, smartphones, mobile computing devices, mobile phones, iPads™, Google Droids™, Microsoft® Surface™, etc.

In various embodiments, a single one of SaaS provider 104 may have multiple subscribers 106-2 at tier 102-2; a single one of subscriber 106-2 at tier 102-2 may have multiple subscribers 106-3 at tier 102-3. Subscribers 106-2 may have accounts with SaaS provider 104 at tier 102-1; subscribers 106-3 may have accounts with subscribers 106-2 at tier 102-2. In various embodiments, SaaS provider 104 may bill subscribers 106-2; subscribers 106-2 in turn may bill subscribers 106-3. The billing at each tier 102 may be based on a variety of factors that may or may not be independent of each other, including application resources used by subscribers 106, number of individual users authorized by subscribers 106 to access business prospecting application 100, and other such factors beyond the scope of the present disclosure.

In various embodiments, the features discussed herein may be mainly provided to and accessed by subscribers 106-2 at tier 102-2. These features, or a subset thereof, may also be provided to and accessed by subscribers 106-3 at tier 102-3. In various embodiments, business prospecting application 100 may empower subscribers 106-2 (e.g., marketing agencies operating at tier 102-2) to effortlessly identify high-quality leads by leveraging advanced data analysis based on specific (e.g., tailored, personalized, etc.) criteria. Business prospecting application 100 may help subscribers 106-2 (or 106-3) overcome various challenges of finding potential customers, increase lead quality and quantity, streamline the sales and marketing process, and ultimately drive revenue growth. By providing advanced data analysis, targeted marketing strategies, and a centralized platform for lead management, the business prospecting application 100 empowers marketing agencies to achieve significant levels of growth and profitability.

In various embodiments, business prospecting application 100 may provide a centralized platform to manage and track leads, automate outreach, and analyze customer data. Business prospecting application 100 may analyze the strength of a prospect's online presence in terms of their listings on third-party sites and reviews by users. In some embodiments, business prospecting application 100 may provide a detailed marketing audit report about the prospects. In addition to summarizing content from various third-party sites, the marketing audit report may also showcase any gaps in the prospect's online marketing strategies. In various embodiments, the marketing audit report may provide listing, review analysis, and business critical information. The listing report may aggregate data from over fifty online directories to show the prospects the number of listings, their accuracy, and any missing listings (e.g., partially missing or wholly missing) on various directory sites. The review analysis may show the online reputation of the prospect location. In some embodiments, a "reviews" section of the menu may display a detailed breakdown of specific reviews, for example, Google Business Profile™ (GBP) and Facebook™ (FB) reviews. This section may highlight both positive and negative feedback, providing insight into the areas where the prospect is excelling and where they need improvement. Subscriber 106-2 may highlight these issues to the prospect, propose optimal solutions and convert the prospects to potential customers. Any business-critical information may be analyzed using available information about the prospect to check against various criteria. By way of examples and not as limitations, the criteria may include: whether the prospects have SMS enabled company phone number; whether the GBP of the prospect is claimed; whether the prospects have missed-call text back; whether the GBP profile has Google Chat™ enabled; whether a chat widget is present in the prospect's website; etc. The report may be hosted on the tiered software framework and shared with prospects suitably. The report may also provide a conversion probability score that weighs various data based on past conversion rates to assess the likelihood of the prospect converting to a customer.

In various embodiments, business prospecting application 100 may include various advantages. An automated lead search may automate the process of finding potential customers, saving time and resources. Using an application programming interface (API) to a third-party map service (e.g., Google™ map), business prospecting application 100 may find prospects in a specific geographical area, making it easier to target and convert them into potential customers. Targeted outreach may help a business identify and target high-quality leads based on specific criteria and preferences. For example, business prospecting application 100 can review the potential customer's website and determine whether it has subscribed to Google Business Messages™ (GBM), a marketing tool provided by a third-party. If not, the agency can advertise support for subscribing to GBM. This can help businesses personalize their outreach efforts and increase the likelihood of converting leads into paying customers.

Business prospecting application 100 may facilitate a centralized platform for managing and tracking leads, which can help businesses streamline their sales and marketing efforts. This can improve communication and collaboration between different teams and ultimately drive revenue growth. Business prospecting application 100 may also facilitate better customer insights for analyzing customer data. Business prospecting application 100 may provide valuable insights into the potential customer's online business performance in the form of the comprehensive marketing audit report.

In one example, marketing agencies can use business prospecting application 100 to streamline prospecting, customize reports, enhance lead management and increase conversions. Business prospecting application 100 may allow these marketing agencies to identify potential customers and leads easily and efficiently. By using map search filters and other features, these marketing agencies can quickly and accurately find prospects that match their target audience, saving them time and effort. With business prospecting application 100, these marketing agencies can generate customized reports for their prospects that analyze their online presence and provide insights into areas for improvement. These reports can help the marketing agencies identify potential issues and develop targeted strategies to improve their prospects' online reputation and visibility. Business prospecting application 100 may make it easy for agencies to keep track of their prospects and monitor their progress. By having all the necessary information in one place, the marketing agencies can stay organized and optimize their conversion process. Further, the marketing agencies can target high-quality leads that are more likely to convert into customers. This targeted approach can increase the chances of success and can lead to increased revenue and growth for the marketing agency.

In various embodiments, business prospecting application 100 for agencies acts as a centralized platform for searching high-quality leads, managing prospects, generating detailed audit reports, and sharing actionable insights with prospects. In a particular example, marketing agencies can search for prospects near them using map search or enter business details manually in business prospecting application 100. After the prospect details are added, business prospecting application 100 may generate an independent marketing audit report for the prospects. The marketing audit report may include a detailed breakdown of the prospect's online listings performance, business reputation in GBP and FB and other relevant information. The marketing agencies can then share this report directly with the prospects, providing them with actionable insights. The list of prospects analyzed can be viewed and managed in a suitable user interface (e.g., in a Dashboard format) for agencies to keep track of their prospects and monitor their progress. When the marketing agency wins the prospect, the prospect can be converted into a client and additional services may be provided on the same tiered software framework.

In various embodiments, business prospecting application 100 may comprise a search module 110 that can interface with various third-party APIs 112 to access corresponding third-party data 114 of one or more prospects 115. Third party data 114 may include, by way of examples and not as limitations, third party location data 116, third party contact data 118, third party social media data 120, and third party website data 122 associated with prospect 115. For example, search module 110 may interface with Google-Maps™ to access third party location data 116 of various prospects 115 (e.g., dentists in zip code 75025; plumbers in Boise, Idaho; etc.) A verification module 124 may include a data aggregator 126, a data analyzer 128 and a data parser 130 (among other modules). Data aggregator 126 may collect third-party data 114, such as third-party location data 116, third-party contact data 118, third-party social media data 120, and third-party website data 122 and store the collected data locally. Data analyzer 128 may analyze the collected and locally stored third-party data 114 based on specific criteria. For example, one of the criteria may be whether prospect 115 responds to its social media feedback, such as comments, questions, and reviews. Data parser 130 may parse the collected and locally stored data, for example, looking at keywords, such as "question," "inquiry," etc. and provide the parsed results to data analyzer 128 that may determine that prospect 115 responds to 80% of comments on one social media platform but not on another. In a specific example, such insights may be useful in determining whether subscriber 106-2 (or subscriber 106-3) can market its services to prospect 115.

A report generator 132 may include a data visualizer 134 for displaying the analysis results in a user-friendly format; a summary module 136 for providing a succinct summary of the analysis results; and a share module 138 for sharing the report appropriately. A user interface 140 may display a series of menus 142 according to tiers 102, for example, tier-1 menu 142-1, tier-2 menu 142-2, and tier-3 menu 142-3. Each of menus 142 may offer features specific to the corresponding tier 102; some features may be visible only to SaaS provider 104 (i.e., users of tier-1 menu 142-2), others only to subscribers 106-2 (i.e., users of tier-2 menu 142-2) and yet others only to subscribers 106-3 (i.e., users of tier-3 menu 142-3).

During operation, subscriber 106-2 may access business application 100 through tier-2 menu 142-2 and seek prospects 115 using search module 110. Tier-2 menu 142-2 may display a map of a geographic location of interest in some embodiments, with arrows or other visual indicators of prospect locations. In some other embodiments, a list of prospects 115 matching the search query may be presented. In some other embodiments, a summary report may be included in the listing. The summary report may include a subset of various criteria of interest, such as likelihood of becoming a paying customer, whether the prospect has a particular type of website, etc. The summary report may be generated by summary module 136 in report generator 132 using data available in all of tiers 102, including tier 102-1, 102-2 and 102-3. Data visualizer 134 may present the summary report in a desired format, based on particular needs. Subscriber 106-2 may select a particular one of prospects 115 from the list. A detailed report on selected prospect 115 may be generated by report generator 132 and data visualizer 134 may present the report appropriately on tier-2 menu 142-2. The report may be shared by share module 138 when subscriber 106-2 selects the "share" functionality.

Figure 2:
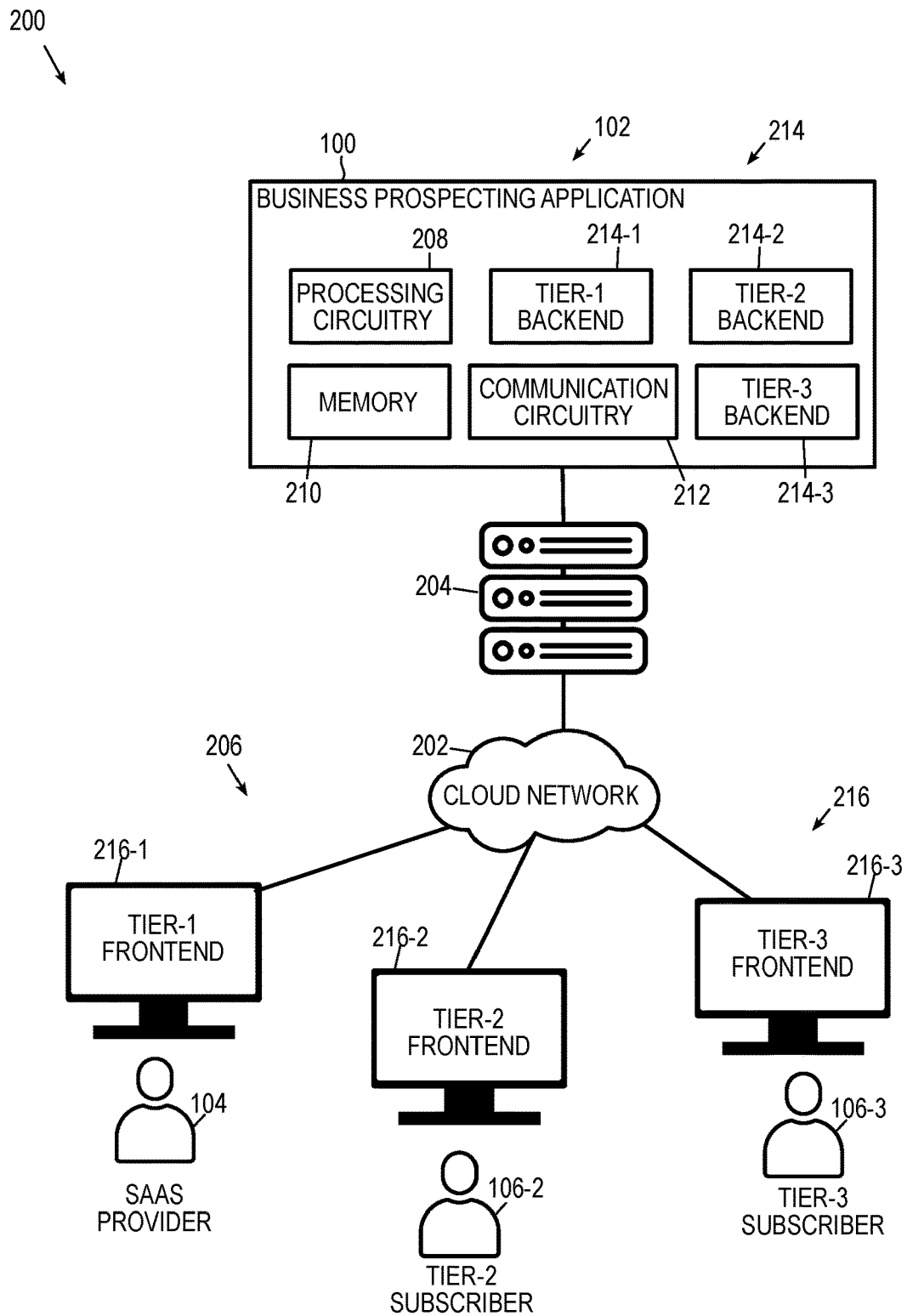
FIG. 2 is a simplified block diagram illustrating example details of the tiered software framework implementing the systems and methods for facilitating business prospecting in a tiered software framework, according to some embodiments of the present disclosure.

FIG. 2 is a simplified block diagram illustrating a tiered software framework 200 according to various embodiments. In example implementations, at least some portions of the activities outlined herein may be hosted on a cloud network 202 in one or more servers 204. At least some other portions of the activities outlined herein may be implemented in one or more computing devices 206 connected over one or more communication networks with cloud network 202. In particular embodiments, cloud network 202 is a collection of hardware devices and executable software forming a shared pool of configurable computing resources (e.g., networks, servers, storage, applications, services, etc.) that may be suitably provisioned to provide on-demand self-service, network access, resource pooling, elasticity and measured service, among other features. Computing device 206 may have any desired form factor, such as a handheld or mobile computing device (e.g., a cell phone, a smart phone, a mobile Internet device, a tablet computer, a laptop computer, a netbook computer, an ultra-book computer, a Personal Digital Assistant (PDA), an ultramobile personal computer, etc.), a desktop computing device, a server or other networked computing component, a set-top box, an entertainment control unit, or a wearable computing device.

Certain portions of tiered software framework 200 (e.g., business prospecting application 100) may execute using a processing circuitry 208, a memory 210 and communication circuitry 212 (among other components) in one or more servers 204. Certain other portions of tiered software framework 200 may execute in one or more computing devices 206 using respective processing circuitry, memory, and communication circuitry (not shown with particularity so as not to clutter the drawing) substantially similar in functionalities to processing circuitry 208, memory 210 and communication circuitry 212. In some embodiments, one or more of these features may be implemented in hardware, provided external to these elements, or consolidated in any appropriate manner to achieve the intended functionality. The various network elements in tiered software framework 200 may include communication software that can coordinate to achieve the operations as outlined herein. In still other embodiments, these elements may include any suitable algorithms, hardware, software, components, modules, interfaces, or objects that facilitate the operations thereof.

Processing circuitry 208 may execute any type of instructions associated with data stored in memory 210 to achieve the operations detailed herein. In one example, processing circuitry 208 may transform data from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., field programmable gate array (FPGA), an erasable programmable read only memory (EPROM), an application specific integrated circuit (ASIC)) that includes digital logic, software, code, electronic instructions, flash memory, optical disks, magnetic or optical cards, other types of machine-readable mediums suitable for storing electronic instructions, or any suitable combination thereof.

In some of example embodiments, one or more memory 210 may store data used for the operations described herein. This includes memory 210 storing instructions (e.g., software, logic, code, etc.) in non-transitory media (e.g., random access memory (RAM), read only memory (ROM), FPGA, EPROM, etc.) such that the instructions are executed to carry out the activities described in this disclosure based on particular needs. In some embodiments, memory 210 may comprise non-transitory computer-readable media, including one or more memory devices such as volatile memory such as dynamic RAM (DRAM), nonvolatile memory (e.g., ROM), flash memory, solid-state memory, and/or a hard drive. In some embodiments, memory 210 may share a die with processing circuitry 208. Memory 210 may include algorithms, code, software modules, and applications, which may be executed by processing circuitry 208. The data being tracked, sent, received, or stored in tiered software framework 200 may be provided in any database, register, table, cache, queue, control list, or storage structure, based on particular needs and implementations, all of which could be referenced in any suitable timeframe.

Communication circuitry 212 may be configured for managing wired or wireless communications for the transfer of data in tiered software framework 200. The term "wireless" and its derivatives may be used to describe circuits, devices, systems, methods, techniques, communications channels, etc., that may communicate data through modulated electromagnetic radiation in a nonsolid medium. The term does not imply that the associated devices do not contain any wires, although in some embodiments they might not. Communication circuitry 212 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long Term Evolution (LTE) project along with any amendments, updates, and/or revisions (e.g., advanced LTE project, ultramobile broadband (UMB) project (also referred to as "3GPP2"), etc.). Communication circuitry 212 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. Communication circuitry 212 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication circuitry 212 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication circuitry 212 may operate in accordance with other wireless protocols in other embodiments. Communication circuitry 212 may include antennas to facilitate wireless communications and/or to receive other wireless communications.

In some embodiments, communication circuitry 212 may manage wired communications, such as electrical, optical, or any other suitable communication protocols (e.g., the Ethernet, Internet). Communication circuitry 212 may include multiple communication chips. For instance, a first communication chip may be dedicated to shorter-range wireless communications such as Wi-Fi or Bluetooth, and a second communication chip may be dedicated to longer-range wireless communications such as global positioning system (GPS), EDGE, GPRS, CDMA, WiMAX, LTE, EV-DO, or others. In some embodiments, a first communication chip may be dedicated to wireless communications, and a second communication chip may be dedicated to wired communications.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a WANs (e.g., the Internet).

Business prospecting application 100 may be implemented in tiered software framework 200 comprising at least three tiers 102: tier-1 (102-1), tier-2 (102-2), and tier-3 (102-3). Tiers 102 may be organized according to a hierarchy of management (i.e., to oversee, to control, to maintain), with upstream tiers managing downstream ones. Thus, tier 102-1 comprises operations that may manage tiers 102-2 and 102-3, whereas tier 102-2 comprises operations that may manage tier 102-3 but not tier 102-1. For purposes of terminology, tier 102-1 is "upstream" relative to tiers 102-2 and 102-3; tier 102-3 is "downstream" relative to tiers 102-2 and 102-1; tier 102-2 is downstream relative to tier 102-1 and upstream relative to tier 102-3. In some embodiments, each tier 102 may interact with the tier immediately adjacent thereto (e.g., downstream or upstream) but not with non-adjacent tiers. In some other embodiments, any tier 102 may interact with any other tier. In an example embodiment, tier 102-3 comprises marketing activities by business locations such as a dentist's office, a plumber's business, etc.; tier 102-2 comprises software operations by one or marketing agencies whose customers are the business locations of tier 102-3; and tier 101-1 comprises software operations by SaaS provider 104 whose customers are the marketing agencies of tier 102-2.

In various embodiments, tiers 102 may be partitioned into a backend 214 and a frontend 216. Backend 214 may comprise tier-1 backend 214-1, tier-2 backend 214-2, and tier-3 backend 214-3 provisioned in one or more servers 204. Likewise, frontend 216 may comprise tier-1 frontend 216-1, tier-2 frontend 216-2, and tier-3 frontend 216-3 provisioned in one or more computing devices 206. Backend 214 may comprise various modules, logic, software engines and other components that are distributed (and common) across all users of tiered software framework 200. Backend 214 may execute operations for managing and processing data, performing computations, and facilitating communication between different components, such as components of business prospecting application 100. In particular embodiments, backend 214 may include operations such as data management, business logic (e.g., business prospecting application 100), user authentication and authorization, security and validation, application programming interfaces (APIs) with third-party components such as payment processors, etc.

In a general sense, frontend 216 comprises at least user interface 140 using which users interact with tiered software framework 200. Frontend 216 may also include libraries, forms, device integrators and other components as desired and based on particular needs. Frontend 216 may be presented on a suitable display device coupled to computing device 206 and appropriate to show visual indicators, such as a heads-up display, a computer monitor, a projector, a touchscreen display, a liquid crystal display (LCD), a light-emitting diode display, and/or a flat panel display. In various embodiments, frontend 216 may be specific to the particular one of tier 102. For example, frontend 216-1 at tier-1 may comprise certain functionalities available (and visible) only to SaaS provider 104. Frontend 216-2 at tier-2 may comprise certain functionalities available (and visible) only to tier-2 subscriber 106-2. Frontend 216-3 at tier-3 may comprise certain functionalities available (and visible) only to tier-3 subscriber 106-3.

Tiered software framework 200 described and shown herein (and/or its associated structures) may also include suitable interfaces for receiving, transmitting, and/or otherwise communicating data or information in a network environment. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

Figure 3:
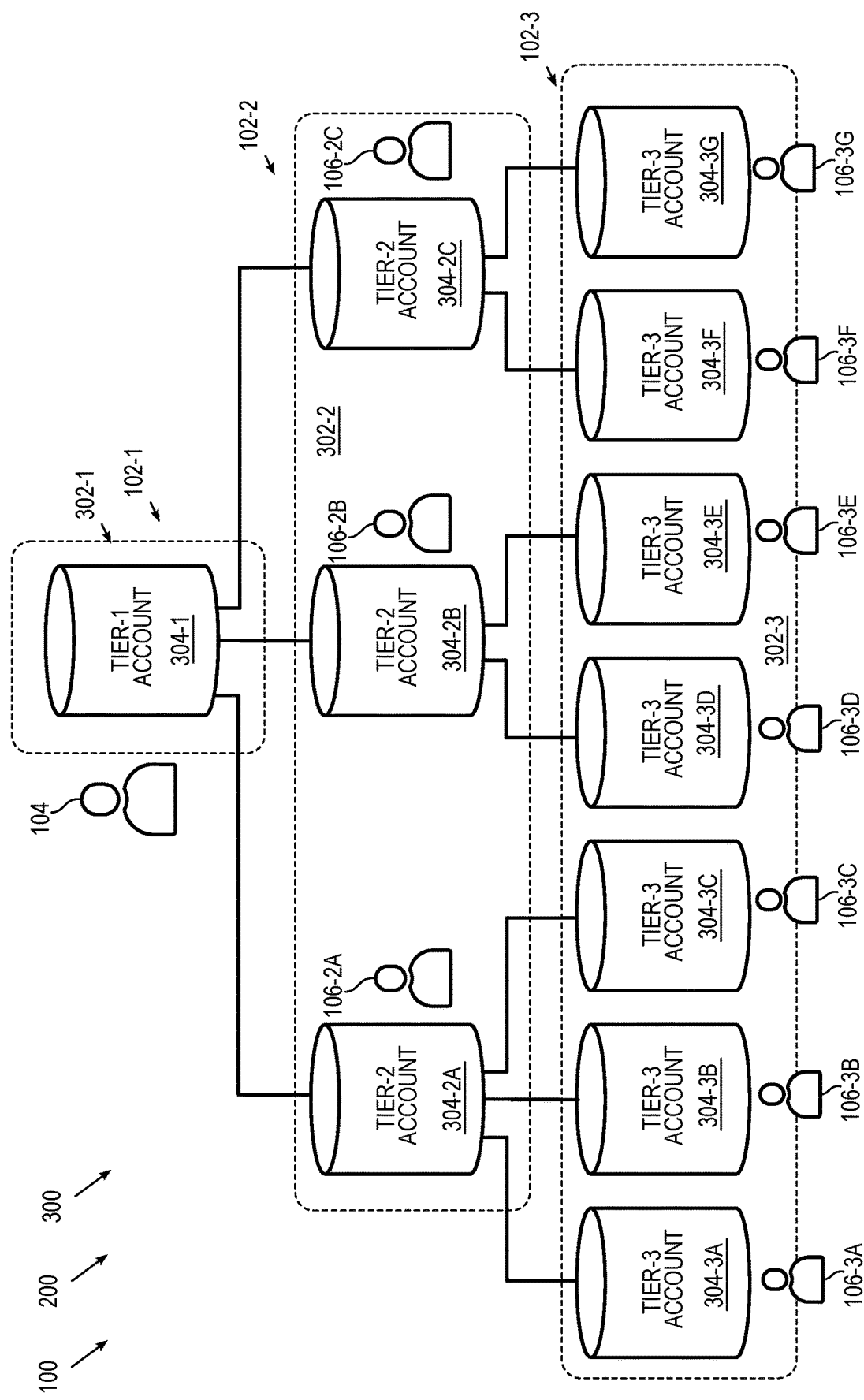
FIG. 3 is a simplified block diagram illustrating other example details of the tiered software framework implementing the systems and methods for facilitating business prospecting in a tiered software framework, according to some embodiments of the present disclosure.

FIG. 3 is a simplified block diagram illustrating example details of data hierarchy 300 of tiered software framework 200 implementing business prospecting application 100, according to some embodiments of the present disclosure. In various embodiments, data 302 communicated in tiered software framework 200 may be exclusively received from users such as SaaS provider 104 and subscribers 106-2, and 106-3; in some other embodiments, data 302 may also be received from other sources, such as third parties and/or from the Internet. Examples of data 302 include business niche targeted by subscribers 106, marketing activities such as on social media, target audience of subscribers 106, login credentials to access various marketing platforms, frequency of marketing activities, information to be included in the content of marketing posts, customer lists, business locations, marketing platform rules, and other such data relevant to the functionalities offered by tiered software framework 200. Data 302 may be stored in data lakes, databases, data warehouses, blockchains, file systems and other types of data storage facilities within the broad scope of the embodiments with corresponding accessing and viewing capabilities as described herein. In various embodiments, data 114 may be a subset of data 302.

Data 302 in each tier 102 may be contained within accounts 304 accessible and viewable with appropriate access credentials. For example, account 304-1 may be associated with SaaS provider 104. Account 304-1 may manage a plurality of accounts 304-2 at tier 102-2. Subscriber 106-2a may have a subscription to account 304-2a in plurality of accounts 304-2. Account 304-2a may manage a plurality of accounts 304-3 at tier 102-3. Subscriber 106-3a may have a subscription to account 304-3a in plurality of accounts 304-3; subscriber 106-3b may have a subscription to account 304-3b in plurality of accounts 304-3; and subscriber 106-3c may have a subscription to account 304-3c in plurality of accounts 304-3. In other words, subscriber 106-2a has three downstream subscribers at tier 102-3, namely subscribers 106-3a, 106-3b, and 106-3c with their associated respective accounts 304-3a, 304-3b, and 304-3c. Likewise for other accounts shown in the figure. Note that such a framework is merely provided for illustrative purposes and should not be construed as a limitation. Any number of subscribers may be provided at tiers 102-2 and 102-3 in tiered software framework 200 within the broad scope of the embodiments. Note also that the labeling convention followed herein uses letters to denote a separate instance of the same component (e.g., "a" denotes instance A, "b" denotes instance B, and so on).

Downstream accounts may also be called "subaccounts" relative to the immediately upstream accounts in this disclosure. For example, accounts 304-3 are subaccounts relative to accounts 304-2. In the specific example shown, accounts 304-3a . . . 304-3c are subaccounts of account 304-2a; accounts 304-3d and 304-3e are subaccounts of account 304-2b; accounts 304-3f and 304-3g are subaccounts of account 304-2c. Likewise, accounts 304-2a . . . 304-2c are subaccounts of account 304-1.

In various embodiments, data 302 may be arranged in data hierarchy 300 for different accounts 304 such that certain users can view and access only a subset of data 302 according to their respective tier 102 and access credentials based on particular needs (e.g., user credentials may indicate which tier 102 and which corresponding accounts 304 are available for access and view). Such accounts 304 may be facilitated by a suitable user interface at frontend 216 for viewing the accessible data. Appropriate user authentication and authorization engines running in backend 214 may ensure that accounts 304 are maintained as desired and appropriate privacy blocks are applied at appropriate tiers 102.

In the example illustrated herein, tier-1 data 302-1 may be of account 304-1; tier-2 data 302-2 may be of accounts 304-2a, 304-2b and 304-2c corresponding to subscribers 106-2a, 106-2b and 106-2c, respectively; tier-3 data 302-3 may be of accounts 304-3a . . . 304-3g corresponding to subscribers 106-3a . . . 106-3g. Subscribers 106-3a . . . 106-3g may access and view their own respective accounts 304-3a . . . 304-3g; however, they cannot access or view other accounts 304 in the same tier 102-3 or in upstream tiers 102-2 or 102-1. Note that accessing and viewing an account refers to accessing and viewing the data of the account. Subscribers 106-2a . . . 106-2c at tier 102-3 may access and view their own respective accounts 304-2a . . . 304-2c as well as downstream accounts 304-3 of their respective subscribers 106-3; however, they cannot access or view other accounts 304-2 in the same tier 102-2, or in downstream tier 102-3 not associated with their downstream subscribers 106-3, or in upstream tier 102-1. For example, subscriber 106-2a may access and view accounts 304-2a, 304-3a, 304-3b, and 304-3c; subscriber 106-2b may access and view accounts 304-2b, 304-3d, and 304-3e; subscriber 106-2c may access and view accounts 304-2c, 304-3f, and 304-3g. SaaS provider 104 at tier 102-1 may access and view accounts 304-1 at tier 102-1, 304-2a . . . 304-2c at tier 102-2, and 304-3a . . . 304-3g at tier 102-3.

Figure 4:
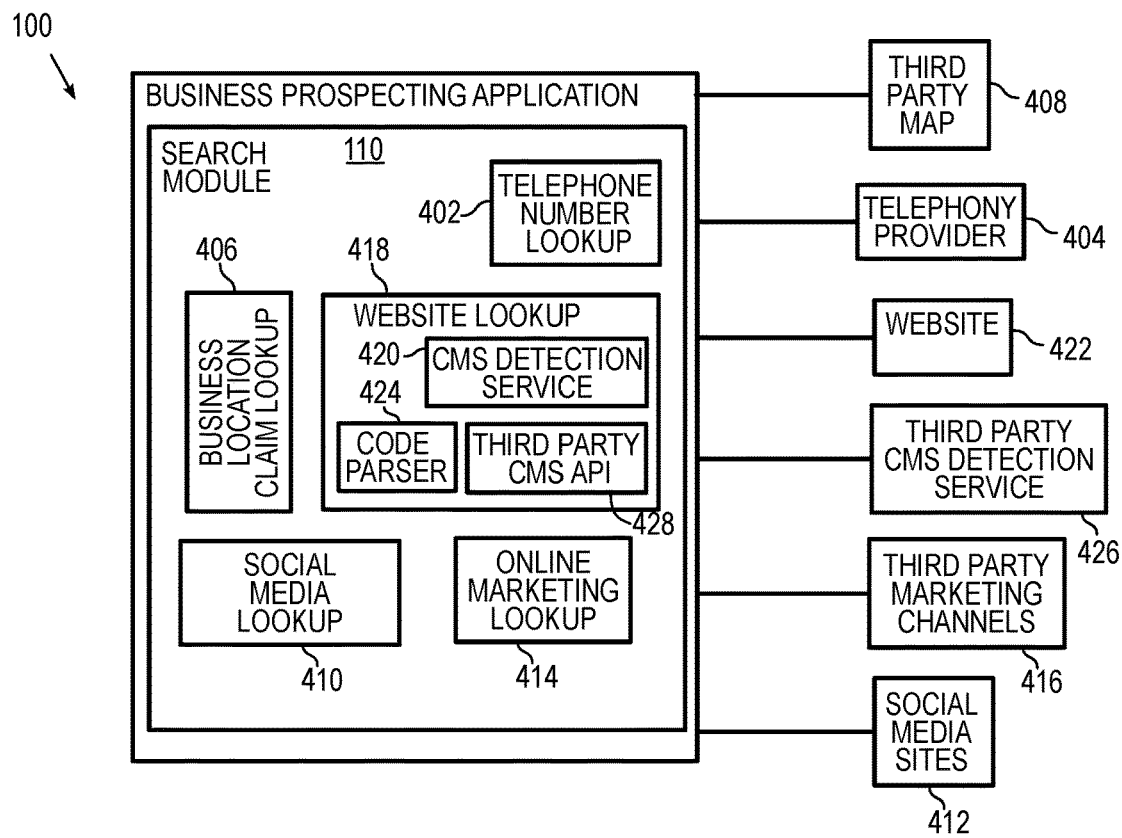
FIG. 4 is a simplified block diagram illustrating example details of the business prospecting application, according to some embodiments of the present disclosure.

FIG. 4 is a simplified block diagram illustrating example details of business prospecting application 100. Search module 110 may include a telephone number lookup 402 may contact a telephony provider 404 to identify whether a telephone number of prospect 115 is text-enabled. Telephony provider 404 may include, by way of examples and not as limitations, companies that provide communication tools such as Internet Protocol phones, applications for sending and receiving text messages, etc. Examples of telephony provider 404 includes Twilio™, Microsoft Teams Phone™, Vonage Business Communications™, RingCentral MVP™. Search module 110 may further include a business location claim lookup 406 that interfaces with a third-party map 408 to determine whether the prospect has claimed a location on the map, for example, so that users of the business may be assured that the location identifier is correct. A social media lookup 410 may interface with social media sites 412 to find various social media profiles and accounts of the prospect. The social media content may be parsed and categorized as positive, negative, etc., based on the social media reviews, comments, responses, etc. found by social media lookup 410. An online marketing lookup 414 may analyze the information available on the Internet to determine whether the prospect has claimed or is using various third-party marketing channels 416, such as Google Business Messaging™, chat widgets, third-party business directory (e.g., GBP), etc.

A website lookup 418 may include a content management system (CMS) detection service 420. CMS detection service 420 may access the prospect's website 422 and analyze the source code of website 422, including website structure, and other characteristics of the website to determine the underlying CMS platform. In a general sense, CMS platforms, also referred to herein as "website platforms" enable users to create, manage, organize, and publish digital content on a website without requiring extensive technical knowledge or coding skills, by using the platform's user-friendly interface for creating and editing content, as well as tools for structuring the website's design and layout. In an example embodiment, website lookup 418 may be configured to determine whether the prospect's website platform is Wordpress™. In some embodiments, CMS detection service 420 may analyze the website's structure and compare to predefined criteria to reach a conclusion. For example, CMS detection service 420 may parse the website source code to identify markers indicating a particular website platform such as Wordpress™. In some embodiments, website lookup 418 may directly read the source code of the website, using a coder parser 424, to determine whether certain keywords associated with Wordpress™ are present in the code. In yet other embodiments, website lookup 418 may interface with third-party CMS detection services 426 using a suitable third-party CMS API 428 to analyze the source code of the website appropriately.

Figure 5:
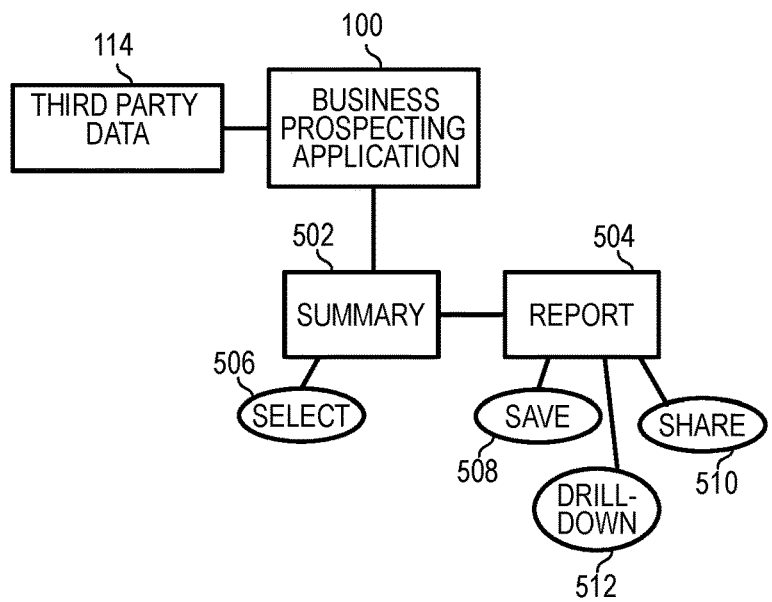
FIG. 5 is a simplified block diagram illustrating other example details of the business prospecting application, according to some embodiments of the present disclosure.

FIG. 5 is a simplified block diagram illustrating example details of business prospecting application 100 according to some embodiments of the present disclosure. Analyzing third-party data 114, business prospecting application 100 may display a summary 502 of the various prospects on a map in user interface 140. Upon selection of a specific prospect by the user, for example, using a "select" button 506, business prospecting application 100 may display a detailed report 504, which may be saved, for example, by selecting a "save" button 508, shared, for example, by selecting a "share" button 510, and additional details looked up, for example, by using a drill-down button 512.

Figure 6A:
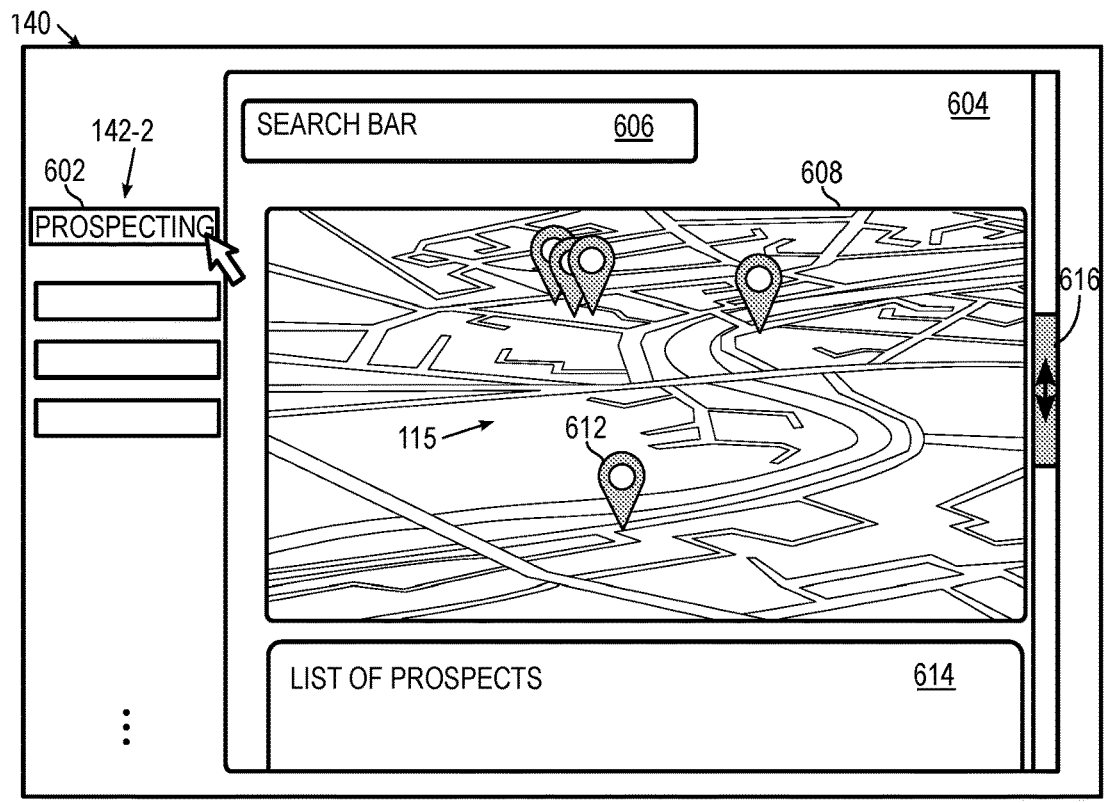
FIGS. 6A-6C are simplified diagrams illustrating yet other example details of the business prospecting application, according to some embodiments of the present disclosure.
Figure 6B:
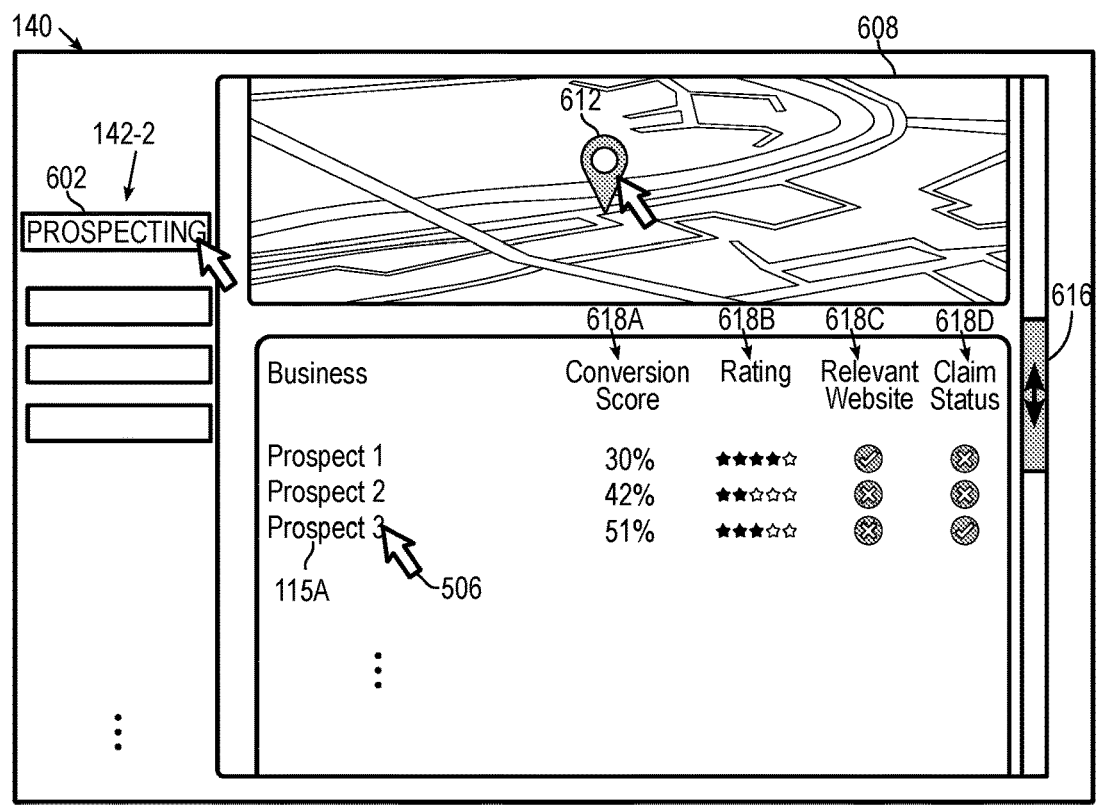
Figure 6C:
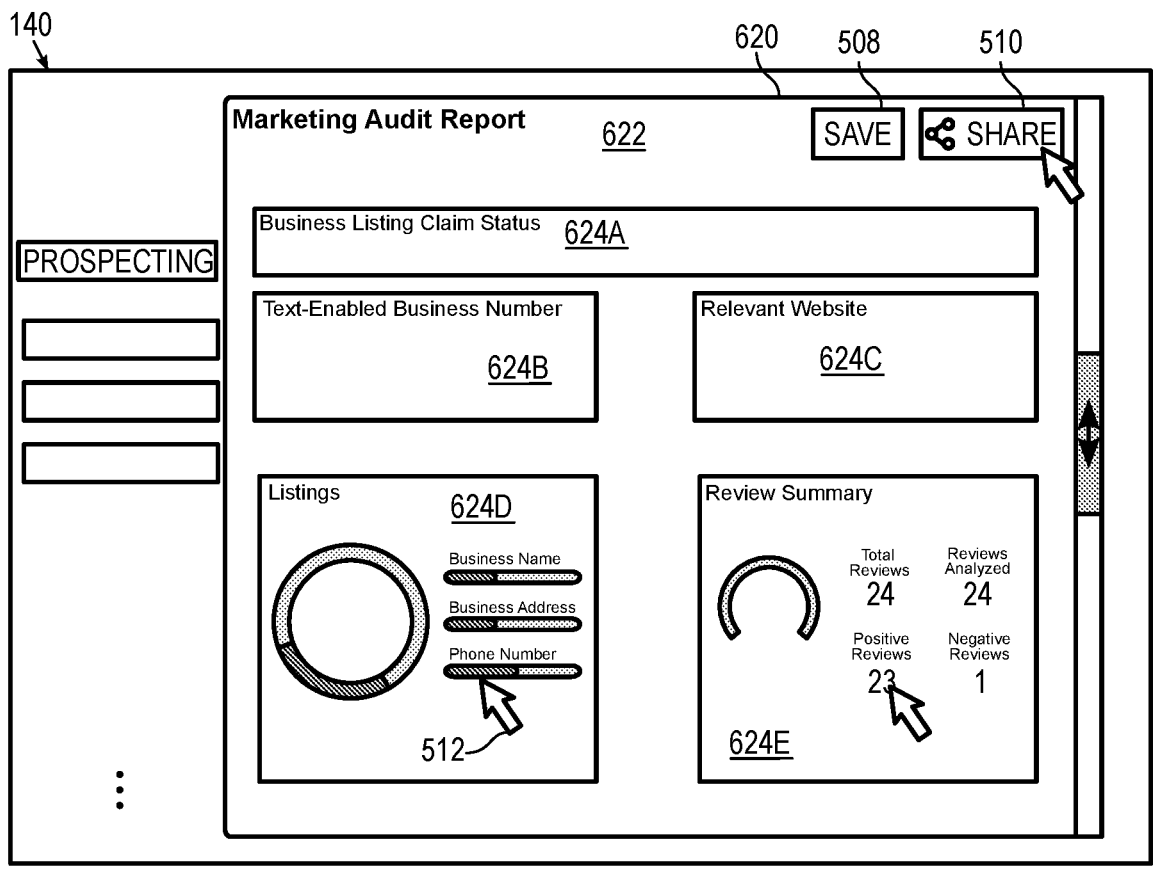

FIGS. 6A-6C are simplified diagrams of example user interface 140 in business prospecting application 100 according to various embodiments. A tier-2 menu 142-2 may be displayed to subscriber 106-2. Instead of performing a search on a generic web browser for prospects in a certain geographic location, the user (e.g., subscriber 106-2) may select a prospecting button 602 on user interface 140. Clicking on or otherwise selecting prospecting button 602 may bring up a window 604 with additional user-interface elements, such as a search bar 606. The user may enter a search query (e.g., "dentists in zip code 12345") in search bar 606 and a map 608 may display results of the search query. Results may comprise prospects 115 shown using location indicators 612 in map 608, or as a summary report 614. In some embodiments, initially (i.e., before any search query is entered), summary report 614 may be unpopulated, and map 608 may default to an unspecific geographic area. Upon entering a search query comprising one or more search terms in search bar 606, map 608 may focus on the geographical area of interest and various prospects 115 may be identified and located using suitable location indicator 612 therein. A scroll bar 616 may allow the user to scroll down and see summary report 614 of prospects 115 located on map 608 in some embodiments.

FIG. 6B shows a view of user display 140 upon scrolling down from the view in FIG. 6A. Summary report 614 of prospects 115 may be shown as an array in some embodiments, with prospects 115 in rows and iconized data of interest shown as icons 618 in columns. The columns may include, as examples and not as limitations, icons 618A representing a likelihood of conversion score (labeled as simply "conversion score" for ease of illustration) (e.g., on a scale of 0 to 100%, with 0% being the least likely to convert, and 100% being the most likely to convert); icons 618B representing a reputation rating score (e.g., 4 stars out of 5, etc.); icons 618C representing a relevant website (i.e., whether the website of prospect 115 was created on a specific website platform, such as Wordpress™), and icons 618D representing claim status, indicating whether the prospect has claimed a specific marketing channel (e.g., claimed its listing in a third-party business directory such as GBP). In various embodiments, the analysis results from analyzing third-party data 114 of prospects 115 may be reduced to numerical values of certain types, such as binary numbers, whole numbers, and rational numbers, which may be represented by icons 618 of different types. For example, binary numbers may be represented as a cross for a first value of the binary number (e.g., 0, representing not relevant, or not claimed, for example) and a check for a second value of the binary number (e.g., 1, representing relevant, or claimed, for example). Whole numbers may be represented as stars in some embodiments, for example, with some of the stars filled out and other stars empty. Rational numbers may be represented as plain numbers such as integers or formatted with two decimal places, etc. In some embodiments, the numbers may be color coded or shown as blocks of color without any associated numerals. Any suitable design and configuration for icons 618 may be used within the broad scope of the embodiments. The array display as described may be a summary report of prospects 115 returned by the search query.

In various embodiments, the columns comprise a subset of criteria against which third-party data 114 is analyzed. For example, in the example shown, the criteria include: likelihood of conversion, rating (e.g., from social media reviews), relevant website (e.g., whether the website of prospect 115 is on a relevant website platform) and claim status (e.g., whether prospect 115 has claimed a marketing channel). These criteria are provided merely as examples and not as limitations. Any suitable criteria may be displayed in summary report 614 as desired and based on particular needs.

FIG. 6C shows yet another view of user display 140. Upon selection of any one prospect 115, for example prospect 115a, in summary report 614 by "select" button 506 represented by an arrow (or hyperlink or other means), another window 620 may open, displaying additional details of the analysis results from analyzing third-party data 114 of selected prospect 115a. The additional details may be presented as a marketing audit report 622. Window 620 may include "save" button 508 and "share" button 510, allowing the user to respectively save or share marketing audit report 622 appropriately.

Marketing audit report 622 may comprise various sections 624. For example, section 624a may display more information about a business listing claim status (e.g., whether prospect 115 has claimed a listing on GBP); another section 624b may display whether prospect 115 has a text enabled business number and other details associated with such information; yet another section 624c may display more information about the preferred website platform for the website of prospect 115 and other such information; yet another section 624d may present pictorial data, for example, showing how many third-party directories list the business name, address, number, etc. of prospect 115; yet another section 624e may present pictorial data showing a summary of social media reviews. Note that the sections displayed in the figure are merely for example purposes and are not to be construed as limitations. Any suitable section, including text and pictorial data may be presented within the broad scope of the embodiments.

In various embodiments, the format of presenting the additional details in sections 624 may depend on the analysis results. For example, if it is determined that selected prospect 115a has a text-enabled phone number, such information may be presented in section 624 in a first format (e.g., colored green, or with a check mark icon, or with appropriate text, or some such user interface element). On the other hand, if selected prospect 115a does not have a text-enabled phone number, such information may be presented in section 624 in a second format (e.g., colored red, or with a cross mark icon, or with appropriate text, or some such user interface element).

In some embodiments, certain portions of marketing audit report 622 may be viewed in greater detail by clicking on or otherwise selecting "drill down" button 512, which may open up a further window, or expose hidden text with more information on the selected data. Thus, with summary report 614 and marketing audit report 622 and the drill down options as described herein, a suitably detailed report may be generated from third-party data 114 that is appropriate for the access credentials of the user performing the search query at tier 102-2 of tiered software framework 200.

Upon selection of a specific prospect by the user, the detailed Marketing Audit Report for that prospect may be displayed. Buttons (or other user interface tools) may be provided for saving the report, sharing the report, etc. The report may include windows and/or boxes for displaying the information in a user-friendly manner. For example, the listing review may be presented graphically, as also the reputation review. Options for drilling down on the details may be presented as clickable hyperlinks. For example, the user may click on the number of positive reviews to access another page (not shown) that collates and presents reviews from various social media sites.

Figure 7:
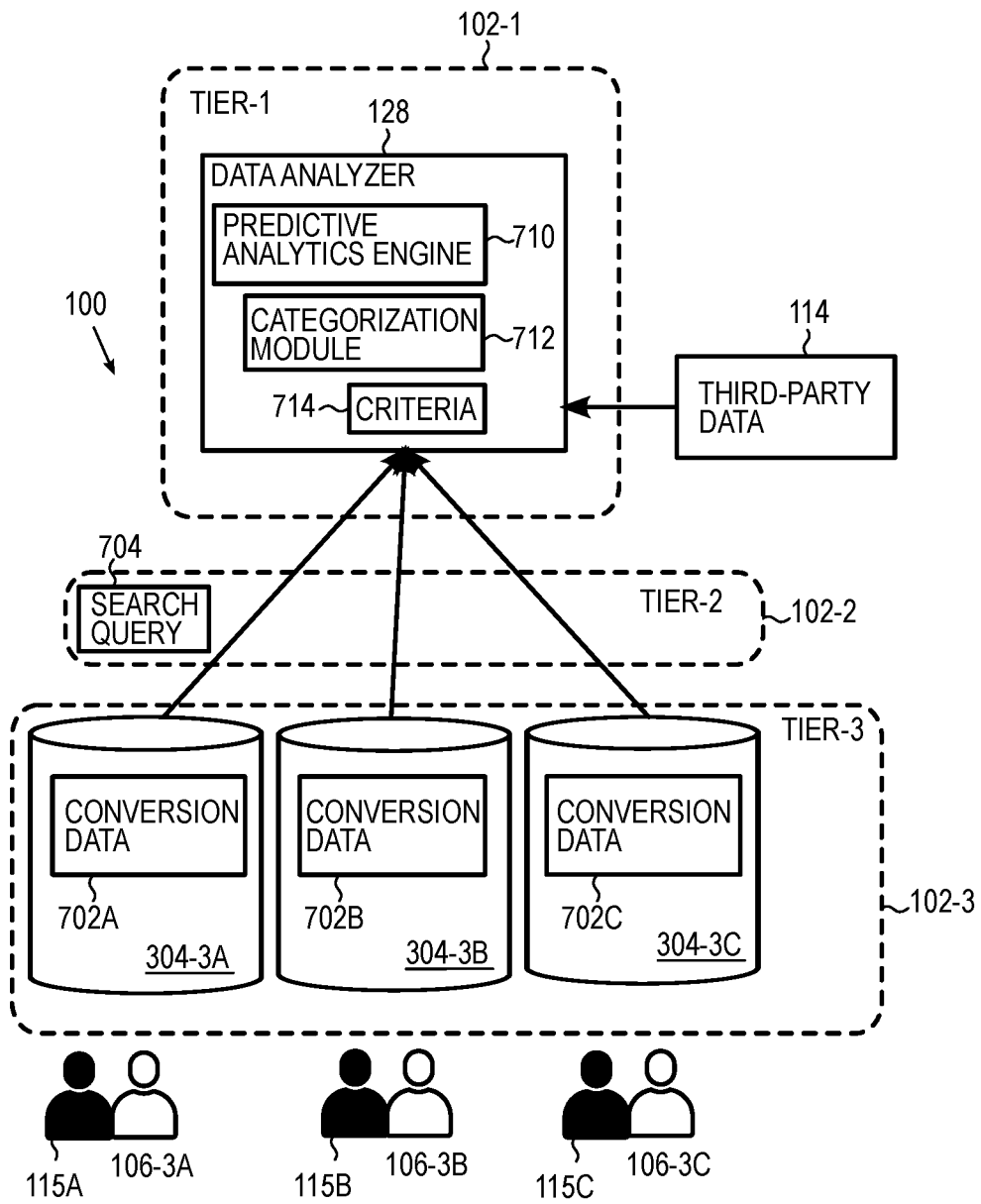
FIG. 7 is a simplified block diagram illustrating yet other example details of the business prospecting application, according to some embodiments of the present disclosure.

FIG. 7 is a simplified block diagram illustrating example details of business prospecting application 100, according to some embodiments of the present disclosure. Data analyzer 128 may operate at tier 102-1. Conversion data 702 of various subscribers 106-3 may be in tier 102-3 and associated with respective accounts 304-3. For example, conversion data 702a of subscriber 106-3a may be associated with account 304-3a; conversion data 702b of subscriber 106-3b may be associated with account 304-3b; conversion data 702c of subscriber 106-3c may be associated with account 304-3c. In the figure, three example accounts 304-3a, 304-3b and 304-3c are shown as associated with respective tier-3 subscribers 106-3a, 106-3b and 106-3c. Any number of accounts 304 may be deployed at tier 102-3 within the broad scope of the embodiments. Tier 102-2 may be pass-through, facilitating data sharing between tiers 102-1 and 102-3. In various embodiments, third-party data 114, being external to business prospecting application 100 may not be associated with any tiers 102. In some embodiments, any requests to perform any analysis by data analyzer 128, for example, via search query 704, may originate at tier 102-2.

In various embodiments, conversion data 702 may comprise status of various indicators associated with subscriber 106-3 at the time of subscribing to tiered software framework 200 (i.e., converting from prospect 708 to subscriber 106). These indicators and the status thereof may suggest a propensity to convert from a prospect to a paying customer. For example, subscriber 106-3a, as a prospect 115a (i.e., before purchasing any subscription), may not have claimed a listing on a particular business directory (e.g., Google My Business™) and may not have had a text-enabled phone number. Subscribing to tiered software framework 200 may have enabled subscriber 106-3a to claim the listing and obtain a text-enabled phone number easily. These two factors may have driven the decision to purchase a subscription. In another example, subscriber 106-3b, as a prospect 115b, may have claimed the listing on the particular business directory, and may have had a text-enabled number, but may not have had a website on a particular website platform (e.g., Wordpress™). Subscribing to tiered software framework 200 may have enabled subscriber 106-3b to create a website on the particular website platform easily. This factor may have driven the decision to purchase a subscription. In yet another example, subscriber 106-3c, as prospect 115c, may have had very little social media presence. Subscribing to tiered software framework 200 may have enabled subscriber 106-3c to increase the social media presence easily. This factor may have driven the decision to purchase a subscription. The status of such different factors in the stored historical data at tier 102-3 may be used to derive a conversion rate of prospects converting to subscribers 106.

Data analyzer 128 may access all accounts 304 at tier 102-3 and has access to conversion data 702 across all accounts 304-3. Thus, even though conversion data 702a is insulated and separate from 702b relative to subscribers 106-3a and 106-3b, they are equally accessible to data analyzer 128. A predictive analytics engine 710 and a categorization module 712 in data analyzer 128 may use conversion data 702a . . . 702c across plurality of accounts 304a . . . 304c to determine conversion rates and associated factors accordingly. These factors which may be determined to drive the propensity for converting from prospect 115 to subscriber 106 may be categorized appropriately and stored as a plurality of criteria 714. Criteria 714 may thereafter be used to analyze data from other prospects 115 and the analysis results presented to report generator 132 appropriately. In some embodiments, for example, publicly available data of prospect 115 may be analyzed and a likelihood of conversion calculated based on historical conversion data 702a . . . 702c. Thus, embodiments of the present disclosure may permit more accurate predictions using substantially all conversion data 702 available thereto while maintaining confidentiality of such conversion data among individual subscribers 106. For example, while subscriber 106-3a may have access to conversion data 702a, conversion data 702b or 702c is not available to subscriber 106-3a. Thus, embodiments of business prospecting application 100 may differ from other business prospecting applications, such as of a single business at least by accessing conversion data 702 of any business subscribed to tiered software framework 200.

In various embodiments, criteria 714 may include, by way of examples and not as limitations: (i) whether prospect 115 has a text-enabled phone number; (ii) whether a website of prospect 115 is on a particular website platform (e.g., Wordpress™); (iii) whether prospect 115 uses third-party marketing tools (e.g., via chat widgets on the website, by listings in third-party marketing sites, etc.) (iv) whether prospect 115 has social media presence, and if so, the types of reviews, comments, responses, and other interactions. associated with the social media presence (e.g., the number of social media reviews, the frequency of responses to the social media reviews, the number of positive social media reviews, the number of negative social media reviews) are among the plurality of criteria; (v) whether prospect 115 is listed in a third-party business directory (e.g., GBM). Various other criteria may be used to analyze third-party data 114 within the broad scope of the embodiments.

In another example, generic business prospecting applications may generate reports based on a generic template. In some such cases, the generic template may not highlight information relevant to the requestor. For example, consider prospect 115a that is a dentist business, and another prospect 115b that is a plumbing business. Assume, merely for the sake of explanation, that subscriber 106-2a in tier 102-2 is interested in prospect 115a and another subscriber 106-2b is interested in prospect 115b. The factors that may interest prospect 115a may not be the same as those that may interest prospect 115b. For example, prospect 115a may be more interested in obtaining a professional website, whereas prospect 115b may be more interested in obtaining social media reviews. Further, the services that subscriber 106-2a has to offer prospect 115a may be different from those that subscriber 106-2b has to offer prospect 115b. For example, subscriber 106-2a may offer automatic calendaring options that could tempt prospect 115a but not 115b, whereas subscriber 106-2b may offer a cost-effective telephone hotline service that could tempt prospect 115b but not 115a. Hence, subscriber 106a may be interested in seeing factors in the report that are relevant not only to prospect 115a, but also to its own services; likewise, subscriber 106b may be interested in seeing factors in the report that are relevant not only to prospect 115b, but also to its own services different from those of subscriber 106a. Such differentiation may not be available with a generic business prospecting application, but embodiments of business prospecting application 100 can provide such tailoring suitably. Thus, the reports generated for different subscribers 106-2 at tier 102-2 may differ from each other.

Although the present disclosure has been described in detail with reference to particular arrangements and configurations, these example configurations and arrangements may be changed significantly without departing from the scope of the present disclosure. For example, although the present disclosure has been described with reference to particular network systems such as cloud networks, business prospecting application 100 may be implemented in other networks such as LANs. Moreover, although tiered software framework 200 has been illustrated with reference to particular elements and operations that facilitate the software process, these elements, and operations may be replaced by any suitable architecture or process that achieves the intended functionality of business prospecting application 100.

Example Methods

Figure 8:
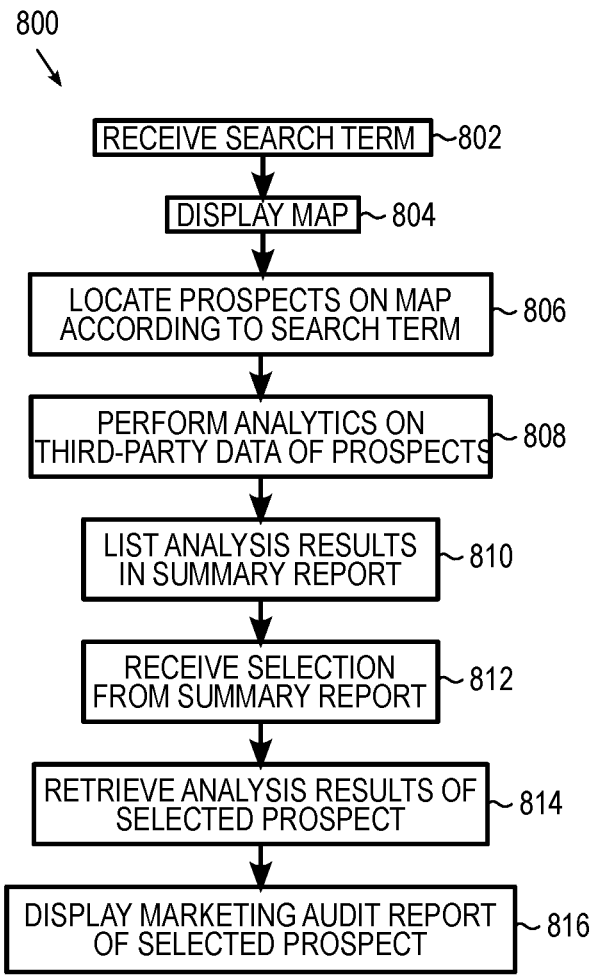
FIG. 8 is a simplified flow diagram illustrating example operations associated with the business prospecting application, according to some embodiments of the present disclosure.

FIG. 8 is a simplified flow diagram illustrating example operations 800 that may be associated with business prospecting application 100 according to various embodiments. At 802, a search term may be received at search module 110. The search term may be from a search query entered in search bar 606 of user display 140. At 804, map 608 may be displayed. In some embodiments, third-party map 408 may be accessed and displayed suitably in user display 140. At 806, prospects 115 may be located on map 608 according to the search term. In one example, the search term may be "dentists in zip code 12345"; business location lookup 406 may locate prospects 115 comprising dentists in zip code 12345 appropriately and identify them on map 408 using suitable location identifiers 612. At 808, data analyzer 128 may perform analysis on third-party data 114 associated with prospects 115. The analysis may be performed on such of third-party data 114 as has been aggregated by data aggregator 126 and parsed by data parser 130. At 810, the analysis results may be listed in summary report 614 in user display 140. At 812, a selection from summary report 614 may be received. At 814, analysis results of the selected prospect 115 may be retrieved. At 816, marketing audit report 622 of the selected prospect 115 may be displayed in user display 140.

Figure 9:
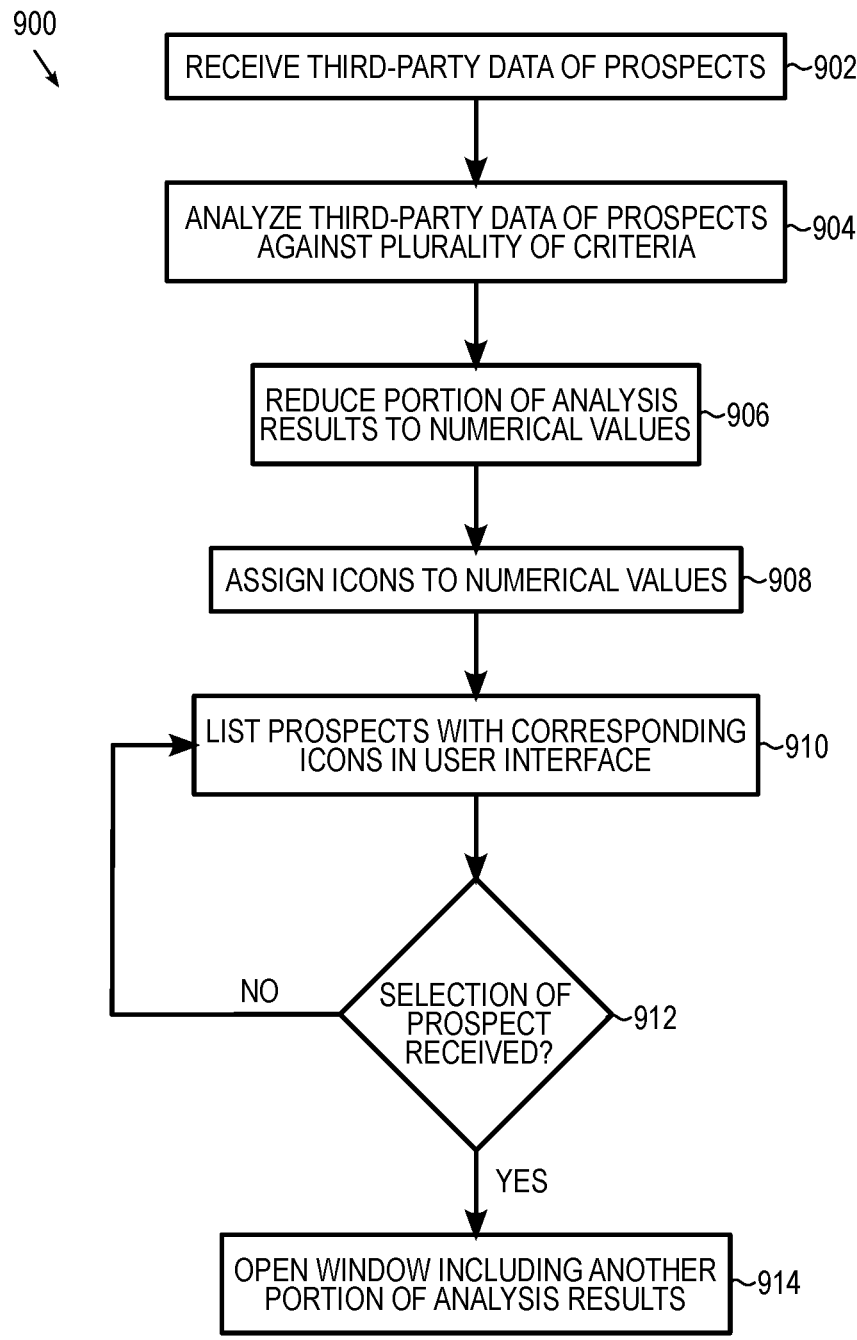
FIG. 9 is a simplified flow diagram illustrating other example operations associated with the business prospecting application, according to some embodiments of the present disclosure.

FIG. 9 is a simplified flow diagram illustrating example operations 900 that may be associated with business prospecting application 100 according to various embodiments. At 902, third-party data 114 of prospects 115 may be received. At 904, third-party data 114 may analyzed against a plurality of criteria 714. At 906, a portion of the analysis results may be reduced to numerical values. The portion may comprise results from the analysis against a subset of the plurality of criteria 714, the subset being associated with higher conversion rates compared to other criteria. At 908, icons 618 may be assigned to represent the numerical values. At 910, prospects 115 may be listed with corresponding icons 618 in user interface 140, for example, in an appropriate window corresponding to summary report 614. At 912, a determination may be made whether a selection of a particular one of prospects 115 (e.g., 115a) has been received. If not, the operations revert to 910. If a selection has been received, at 914, responsive to the selection, another window 620 including marketing audit report 622 comprising another portion of the analysis results may be automatically opened. Marketing audit report 622 may include results for selected prospect 115a from analysis against all criteria 714 (and not just a selected portion as in summary report 614).

Figure 10:
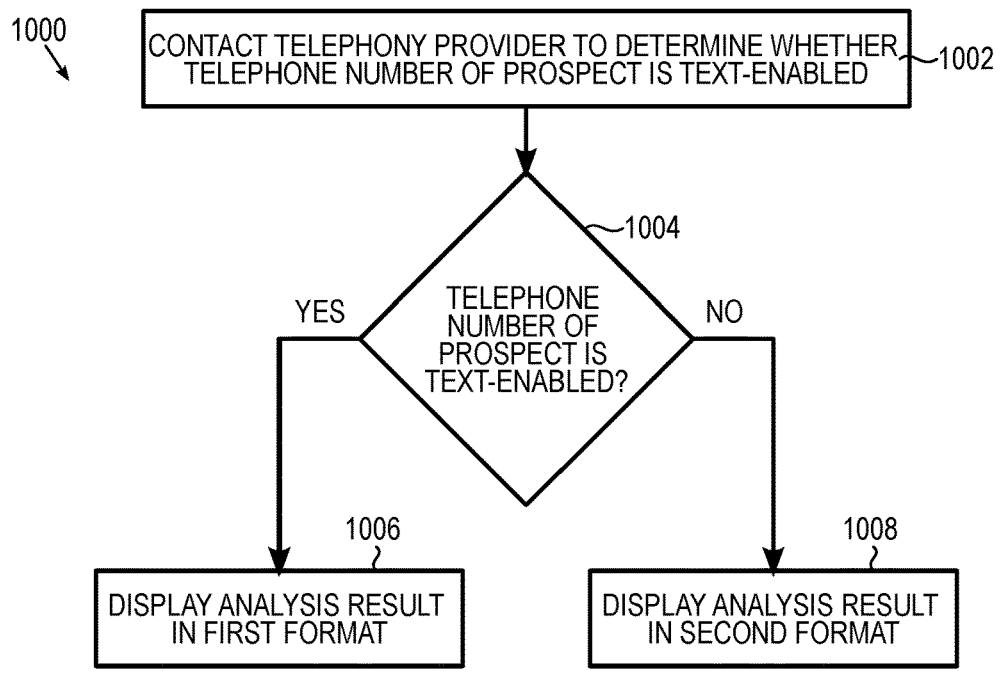
FIG. 10 is a simplified flow diagram illustrating yet other example operations associated with the business prospecting application, according to some embodiments of the present disclosure.

FIG. 10 is a simplified flow diagram illustrating example operations 1000 that may be associated with business prospecting application 100 according to various embodiments. At 1002, telephony provider 404 may be contacted to determine whether a telephone number of prospect 115 is text-enabled. A text-enabled phone number may be one of the plurality of criteria 714 for analyzing third-party data 114. At 1002, a determination may be whether the telephone number is text-enabled. The determination may be by parsing the response from telephony provider 404 and then using a suitable language model to decipher the semantics of the response. Responsive to determining that the telephone number of prospect 115 is text-enabled, at 1006, the corresponding analysis result may be displayed in a first format (e.g., in green color, or with a check mark icon, etc.). Responsive to determining that the telephone number of prospect 115 is not text-enabled, at 1008, the corresponding analysis result may be displayed in a second format (e.g., in red color, with cross mark icon, etc.)

FIG. 11 is a simplified flow diagram illustrating example operations 1100 that may be associated with business prospecting application 100 according to various embodiments. At 1102, source codes of one of websites 422 of one of prospects 115 may be analyzed to identify the respective website platform (e.g., CMS platform). At 1104, the identified website platform may be compared with a specific website platform (e.g., Wordpress™), which may be one of the plurality of criteria 714. Responsive to determining that the identified website platform is the particular website platform, at 1006, the website may be marked as not relevant. For example, there may be no relevance to marketing a website on the specific website platform to prospect 115 if prospect 115 already has a website on the specific website platform. At 1108, the analysis result may be reduced to a first binary number. Responsive to determining that the identified website platform is not the particular website platform, at 1110, the website may be marked as relevant. For example, there may be a business relevance with the possibility of marketing a website on the specific website platform to prospect 115 if prospect 115 does not have a website on the specific website platform. At 1112, the analysis result may be reduced to a second binary number.

Figure 12:
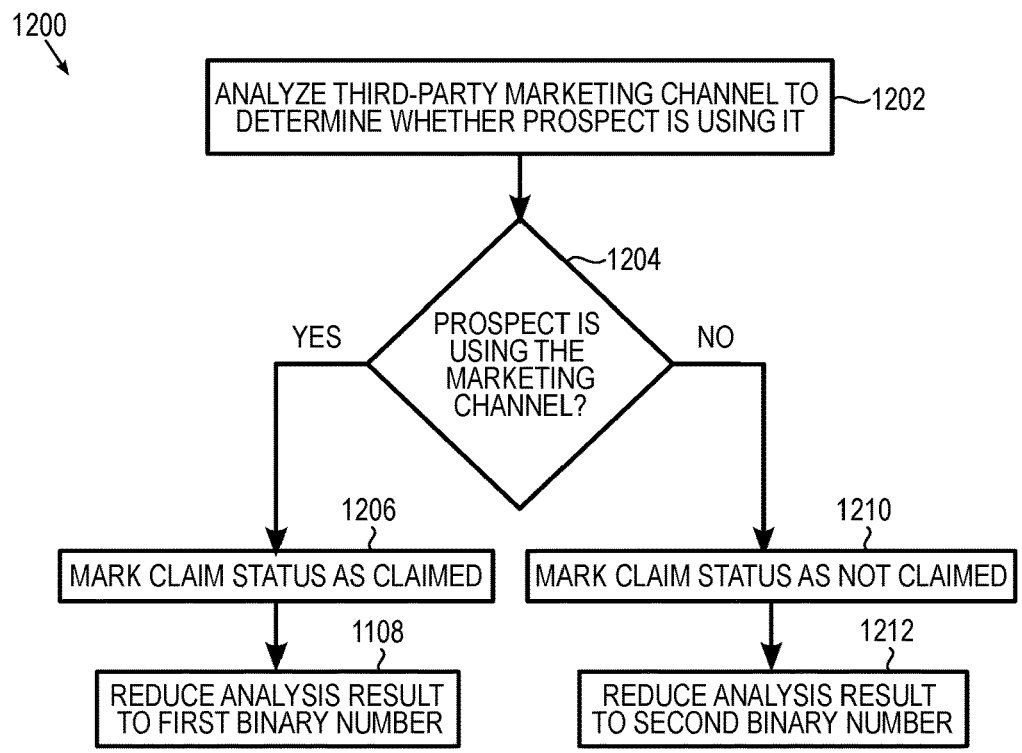
FIG. 12 is a simplified flow diagram illustrating yet other example operations associated with the business prospecting application, according to some embodiments of the present disclosure.

FIG. 12 is a simplified flow diagram illustrating example operations 1200 that may be associated with business prospecting application 100 according to various embodiments. At 1202, third-party marketing channel 416 may be analyzed to determine whether prospect 115 is using third-party marketing channel 416. For example, GBP listings may be parsed to search for the name or address of prospect 115. At 1204, a determination may be whether prospect 115 is using third-party marketing channel 416. Responsive to determining that prospect 115 is using third-party marketing channel 416, at 1206, the claim status of prospect 115 may be marked as claimed. At 1108, the analysis result may be reduced to a first binary number. Responsive to determining that prospect 115 is not using third-party marketing channel 416, at 1210, the claim status of prospect 115 may be marked as not claimed. At 1212, the analysis result may be reduced to a second binary number.

Figure 13:
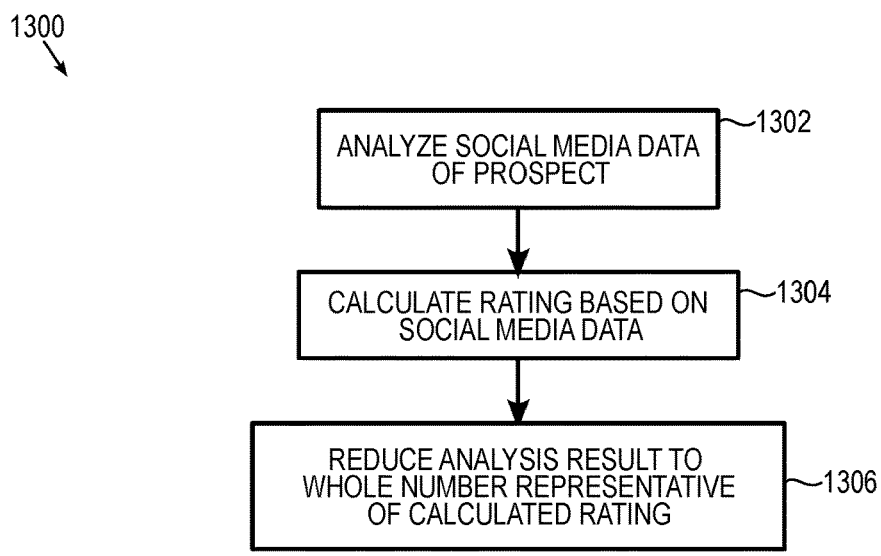
FIG. 13 is a simplified flow diagram illustrating yet other example operations associated with the business prospecting application, according to some embodiments of the present disclosure.

FIG. 13 is a simplified flow diagram illustrating example operations 1300 that may be associated with business prospecting application 100 according to various embodiments. At 1302, social media data 120 of prospect 115 may be analyzed against the plurality of criteria 714. In various embodiments, criteria 714 may comprise the number of social media reviews, the frequency of responses to the social media reviews, the number of positive social media reviews and the number of negative social media reviews. At 1304, a rating for prospect 115 may be calculated based on the analyzed social media data 120. At 1306, the analysis result may be reduced to a whole number representative of the calculated rating.

In various embodiments, the operations described in FIGS. 8-13 are performed automatically without human intervention. Although FIGS. 8-9 illustrate various operations performed in a particular order, this is simply illustrative, and the operations discussed herein may be reordered and/or repeated as suitable. Further, additional operations which are not illustrated may also be performed without departing from the scope of the present disclosure. Also, various ones of the operations discussed herein with respect to FIGS. 8-13 may be modified in accordance with the present disclosure to facilitate business prospecting in tiered software framework 200 as disclosed herein. Although various operations are illustrated in FIGS. 8-13 once each, the operations may be repeated as often as desired.

It is important to note that the operations described with reference to the preceding figures illustrate only some of the possible scenarios that may be executed by, or within, business prospecting application 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion.

Select Examples

Example 1 provides a method for automatically facilitating business prospecting in a tiered software framework, the method comprising: receiving third-party data at a tiered software framework, the third-party data associated with prospects in a geographic location; generating analysis results by analyzing the third-party data of the prospects against a plurality of criteria, in which: the tiered software framework includes data in a first tier, a second tier, and a third tier, data in the second tier is associated with a plurality of accounts, each account having a plurality of subaccounts at the third tier, data associated with any one account in the second tier and the third tier is inaccessible to other accounts, each criterion is associated with a conversion rate of previous prospects converting to subscribers at the third tier based on historical data, and the historical data comprises data in the third tier associated with the pluralities of subaccounts; reducing a portion of the analysis results to numerical values, in which the portion comprises results from analysis against a subset of the plurality of criteria, the subset being associated with higher conversion rates compared to other criteria; assigning icons to represent the numerical values, subsets of the icons corresponding to separate ones of the prospects; listing the prospects with corresponding icons in a first window of a user interface; and responsive to a selection of one of the prospects, automatically opening a second window including another portion of the analysis results, the another portion including results for the selected prospect from analysis against all criteria in the plurality of criteria.

Example 2 provides the method of example 1, in which: the another portion comprises pictorial data, and the method further comprises responsive to a selection of the pictorial data, displaying analysis results represented by the pictorial data in numerical form or textual form.

Example 3 provides the method of any one of examples 1-2, in which the third-party data comprises: telephone numbers of the prospects, source codes of websites of the prospects; third-party marketing channels used by the prospects; social media data of the prospects; and publicly available business data of the prospects.

Example 4 provides the method of example 3, further comprising: contacting a telephony provider to identify whether a telephone number of a prospect is text-enabled, in which a text-enabled phone number is one of the plurality of criteria; responsive to determining that the telephone number of the prospect is text-enabled, displaying the corresponding analysis result in the second window in a first format; and responsive to determining that the telephone number of the prospect is not text-enabled, displaying the corresponding analysis result in the second window in a second format.

Example 5 provides the method of any one of examples 3-4, further comprising: analyzing the source code of a website to identify a website platform of the website; comparing the identified website platform with a particular website platform; responsive to determining that the identified website platform is the particular website platform, marking the website as not relevant, and reducing the analysis result to a first binary number; and responsive to determining that the identified website platform is not the particular website platform, marking the website as relevant, and reducing the analysis result to a second binary number.

Example 6 provides the method of any one of examples 3-5, further comprising: analyzing a third-party marketing channel to determine whether a prospect is using the third-party marketing channel; responsive to determining that the prospect is using the third-party marketing channel, marking a claim status of the prospect as claimed, and reducing a corresponding analysis result to a first binary number; and responsive to determining that the prospect is not using the third-party marketing channel, marking the example status of the prospect as not claimed, and reducing a corresponding analysis result to a second binary number.

Example 7 provides the method of any one of examples 3-6, further comprising: analyzing the social media data of a prospect against the plurality of criteria comprising a number of social media reviews, a frequency of responses to the social media reviews, a number of positive social media reviews and a number of negative social media reviews; calculating a rating based on the analyzed social media data; and reducing a corresponding analysis result to a whole number representative of the calculated rating.

Example 8 provides the method of any one of examples 1-7, further comprising: receiving a search query for prospects in the geographic location, in which: the search query is entered in a search bar on the user interface, and the user interface displays a menu compatible with access credentials to the second tier; and displaying locations of the prospects on a map in the first window of the user interface, each prospect being identified by an identifier icon.

Example 9 provides the method of any one of examples 1-8, in which: the numerical values are one of three types: binary numbers, whole numbers, and rational numbers, the icons are of a first type for numerical values that are binary numbers, the icons are of a second type for numerical values that are whole numbers, and the icons are of a third type for numerical values that are rational numbers.

Example 10 provides the method of example 9, in which: the icons of the first type are a check mark for a first value of the binary number and a cross for a second value of the binary number, the icons of the second type are stars, in which a number of stars represents the whole number, and the icons of the third type are numbers corresponding to the rational numbers.

Example 11 provides non-transitory computer-readable tangible media that includes instructions for execution, which when executed by a processor of a computing device, is operable to perform operations comprising: receiving third-party data at a tiered software framework, the third-party data associated with prospects in a geographic location; generating analysis results by analyzing the third-party data of the prospects against a plurality of criteria, in which: the tiered software framework includes data in a first tier, a second tier, and a third tier, data in the second tier is associated with a plurality of accounts, each account having a plurality of subaccounts at the third tier, data associated with any one account in the second tier and the third tier is inaccessible to other accounts, each criterion is associated with a conversion rate of previous prospects converting to subscribers at the third tier based on historical data, and the historical data comprises data in the third tier associated with the pluralities of subaccounts; reducing a portion of the analysis results to numerical values, in which the portion comprises results from analysis against a subset of the plurality of criteria, the subset being associated with higher conversion rates compared to other criteria; assigning icons to represent the numerical values, subsets of the icons corresponding to separate ones of the prospects; listing the prospects with corresponding icons in a first window of a user interface; and responsive to a selection of one of the prospects, automatically opening a second window including another portion of the analysis results, the another portion including results for the selected prospect from analysis against all criteria in the plurality of criteria.

Example 12 provides the non-transitory computer-readable tangible media of example 11, in which: the another portion comprises pictorial data, and the operations further comprise responsive to a selection of the pictorial data, displaying analysis results represented by the pictorial data in numerical form or textual form.

Example 13 provides the non-transitory computer-readable tangible media of any one of examples 11-12, in which the third-party data comprises: telephone numbers of the prospects, source codes of websites of the prospects; third-party marketing channels used by the prospects; social media data of the prospects; and publicly available business data of the prospects.

Example 14 provides the non-transitory computer-readable tangible media of example 13, in which the operations further comprise: contacting a telephony provider to identify whether a telephone number of a prospect is text-enabled, in which a text-enabled phone number is one of the plurality of criteria; responsive to determining that the telephone number of the prospect is text-enabled, displaying the corresponding analysis result in the second window in a first format; and responsive to determining that the telephone number of the prospect is not text-enabled, displaying the corresponding analysis result in the second window in a second format.

Example 15 provides the non-transitory computer-readable tangible media of any one of examples 13-14, in which the operations further comprise: analyzing the source code of a website to identify a website platform of the website; comparing the identified website platform with a particular website platform; responsive to determining that the identified website platform is the particular website platform, marking the website as not relevant, and reducing the analysis result to a first binary number; and responsive to determining that the identified website platform is not the particular website platform, marking the website as relevant, and reducing the analysis result to a second binary number.

Example 16 provides the non-transitory computer-readable tangible media of any one of examples 13-15, in which the operations further comprise: analyzing a third-party marketing channel to determine whether a prospect is using the third-party marketing channel; responsive to determining that the prospect is using the third-party marketing channel, marking a claim status of the prospect as claimed, and reducing a corresponding analysis result to a first binary number; and responsive to determining that the prospect is not using the third-party marketing channel, marking the example status of the prospect as not claimed, and reducing a corresponding analysis result to a second binary number.

Example 17 provides the non-transitory computer-readable tangible media of any one of examples 13-16, in which the operations further comprise: analyzing the social media data of a prospect against the plurality of criteria comprising a number of social media reviews, a frequency of responses to the social media reviews, a number of positive social media reviews and a number of negative social media reviews; calculating a rating based on the analyzed social media data; and reducing a corresponding analysis result to a whole number representative of the calculated rating.

Example 18 provides the non-transitory computer-readable tangible media of any one of examples 11-17, in which the operations further comprise: receiving a search query for prospects in the geographic location, in which: the search query is entered in a search bar on the user interface, and the user interface displays a menu compatible with access credentials to the second tier; and displaying locations of the prospects on a map in the first window of the user interface, each prospect being identified by an identifier icon.

Example 19 provides the non-transitory computer-readable tangible media of any one of examples 11-18, in which: the numerical values are one of three types: binary numbers, whole numbers, and rational numbers, the icons are of a first type for numerical values that are binary numbers, the icons are of a second type for numerical values that are whole numbers, and the icons are of a third type for numerical values that are rational numbers.

Example 20 provides the non-transitory computer-readable tangible media of example 19, in which: the icons of the first type are a check mark for a first value of the binary number and a cross for a second value of the binary number, the icons of the second type are stars, in which a number of stars represents the whole number, and the icons of the third type are numbers corresponding to the rational numbers.

Example 21 provides an apparatus comprising: a processing circuitry; a memory storing data; and a communication circuitry, in which the processing circuitry executes instructions associated with the data, the processing circuitry is coupled to the communication circuitry and the memory, and the processing circuitry and the memory cooperate, such that the apparatus is configured for: receiving third-party data at a tiered software framework, the third-party data associated with prospects in a geographic location; generating analysis results by analyzing the third-party data of the prospects against a plurality of criteria, in which: the tiered software framework includes data in a first tier, a second tier, and a third tier, data in the second tier is associated with a plurality of accounts, each account having a plurality of subaccounts at the third tier, data associated with any one account in the second tier and the third tier is inaccessible to other accounts, each criterion is associated with a conversion rate of previous prospects converting to subscribers at the third tier based on historical data, and the historical data comprises data in the third tier associated with the pluralities of subaccounts; reducing a portion of the analysis results to numerical values, in which the portion comprises results from analysis against a subset of the plurality of criteria, the subset being associated with higher conversion rates compared to other criteria; assigning icons to represent the numerical values, subsets of the icons corresponding to separate ones of the prospects; listing the prospects with corresponding icons in a first window of a user interface; and responsive to a selection of one of the prospects, automatically opening a second window including another portion of the analysis results, the another portion including results for the selected prospect from analysis against all criteria in the plurality of criteria.

Example 22 provides the apparatus of example 21, in which: the another portion comprises pictorial data, and the apparatus is further configured for: responsive to a selection of the pictorial data, displaying analysis results represented by the pictorial data in numerical form or textual form.

Example 23 provides the apparatus of any one of examples 21-22, in which the third-party data comprises: telephone numbers of the prospects, source codes of websites of the prospects; third-party marketing channels used by the prospects; social media data of the prospects; and publicly available business data of the prospects.

Example 24 provides the apparatus of example 23, further configured for: contacting a telephony provider to identify whether a telephone number of a prospect is text-enabled, in which a text-enabled phone number is one of the plurality of criteria; responsive to determining that the telephone number of the prospect is text-enabled, displaying the corresponding analysis result in the second window in a first format; and responsive to determining that the telephone number of the prospect is not text-enabled, displaying the corresponding analysis result in the second window in a second format.

Example 25 provides the apparatus of any one of examples 23-24, further configured for: analyzing the source code of a website to identify a website platform of the website; comparing the identified website platform with a particular website platform; responsive to determining that the identified website platform is the particular website platform, marking the website as not relevant, and reducing the analysis result to a first binary number; and responsive to determining that the identified website platform is not the particular website platform, marking the website as relevant, and reducing the analysis result to a second binary number.

Example 26 provides the apparatus of any one of examples 23-25, further configured for: analyzing a third-party marketing channel to determine whether a prospect is using the third-party marketing channel; responsive to determining that the prospect is using the third-party marketing channel, marking a claim status of the prospect as claimed, and reducing a corresponding analysis result to a first binary number; and responsive to determining that the prospect is not using the third-party marketing channel, marking the example status of the prospect as not claimed, and reducing a corresponding analysis result to a second binary number.

Example 27 provides the apparatus of any one of examples 23-26, further configured for: analyzing the social media data of a prospect against the plurality of criteria comprising a number of social media reviews, a frequency of responses to the social media reviews, a number of positive social media reviews and a number of negative social media reviews; calculating a rating based on the analyzed social media data; and reducing a corresponding analysis result to a whole number representative of the calculated rating.

Example 28 provides the apparatus of any one of examples 21-27, further configured for: receiving a search query for prospects in the geographic location, in which: the search query is entered in a search bar on the user interface, and the user interface displays a menu compatible with access credentials to the second tier; and displaying locations of the prospects on a map in the first window of the user interface, each prospect being identified by an identifier icon.

Example 29 provides the apparatus of any one of examples 21-28, in which: the numerical values are one of three types: binary numbers, whole numbers, and rational numbers, the icons are of a first type for numerical values that are binary numbers, the icons are of a second type for numerical values that are whole numbers, and the icons are of a third type for numerical values that are rational numbers.

Example 30 provides the apparatus of example 29, in which: the icons of the first type are a check mark for a first value of the binary number and a cross for a second value of the binary number, the icons of the second type are stars, in which a number of stars represents the whole number, and the icons of the third type are numbers corresponding to the rational numbers.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A method for automatically facilitating business prospecting in a tiered software framework, the method comprising:

providing a user interface (UI) in a first computing device, the UI comprising a first UI element selectable by a user associated with an account in the tiered software framework;

responsive to the user selecting the first UI element, performing operations in a second computing device, the operations comprising:

automatically searching external networks for prospects of interest to the user;

responsive to finding a prospect, automatically querying third-party databases through corresponding third-party application programming interfaces (APIs), collecting third-party data about the prospect from the third-party databases, and storing the third-party data in the tiered software framework;

retrieving historical data associated with all accounts in the tiered software framework;

identifying criteria from the historical data, the criteria indicative of conversion of prospects to customers and relevant to the user based on information in the user's account; and analyzing the stored third-party data about the prospect according to the identified criteria to generate analysis results;

responsive to generating the analysis results, transforming, by a data visualizer in the second computing device, a subset of the analysis results into a first report comprising an array of rows and columns, wherein:

the subset is selected based on criteria of interest to the user as determined from information in the user's account, and the prospect is listed in one of the rows and the subset of the analysis results is listed as icons in the corresponding columns;

displaying the first report in a first window of the UI in the first computing device, wherein the displaying causes the rows in the array to be selectable with a second UI element;

responsive to the user selecting the prospect in the first report with the second UI element, transforming, by the data visualizer in the second computing device, the analysis results into a second report;

displaying the second report in a second window of the UI in the first computing device, wherein the displaying causes a portion of the analysis results to be hidden but selectable with a third UI element; and responsive to the user selecting the hidden portion with the third UI element, causing the hidden portion to be visible in the UI in the first computing device.

2. The method of claim 1, wherein the user's interest is determined from a search query input by the user in a search field in the UI.

3. The method of claim 1, wherein:
the first UI element is a selectable button,
the second UI element is a selectable hyperlink, and
the third UI element is a drill-down button.

4. The method of claim 1, wherein:
the second report comprises a plurality of sections, and
each section is presented in a different format selected from pictures, numbers, text, and icons.

5. The method of claim 4, wherein the hidden portion is represented by one of the pictures or icons, and the method further comprises: responsive to selecting the one of the pictures or icons with the third UI element, displaying corresponding analysis results in the second report as numbers or text.

6. The method of claim 1, wherein the data about the prospect comprises:
telephone numbers of the prospect;
source codes of websites of the prospect;
third-party marketing channels used by the prospect;
social media data of the prospect; and
publicly available business data of the prospect.

7. The method of claim 6, wherein one of the third-party databases comprises a telephone provider, and the method further comprises:

identifying whether a telephone number of the prospect is text-enabled according to the telephone provider, wherein having a text-enabled phone number is one of the criteria;

responsive to determining that the telephone number of the prospect is text-enabled, displaying the corresponding analysis result in the first report as a first icon; and responsive to determining that the telephone number of the prospect is not text-enabled, displaying the corresponding analysis result in the first report as a second icon.

8. The method of claim 6, further comprising:
analyzing the source code of a website to identify a website platform of the website;
comparing the identified website platform with a particular website platform;
responsive to determining that the identified website platform is the particular website platform, marking the website as not relevant, and displaying the corresponding analysis result as a first icon in the first report; and
responsive to determining that the identified website platform is not the particular website platform, marking the website as relevant, and displaying the corresponding analysis result as a second icon in the first report.

9. Non-transitory computer-readable tangible media that includes instructions for execution, which when executed by a processor of a computing device, is operable to perform operations comprising:

providing a user interface (UI) in a first computing device, the UI comprising a first UI element selectable by a user associated with an account in a tiered software framework;

responsive to the user selecting the first UI element, performing operations in a second computing device, the operations comprising:

automatically searching external networks for prospects of interest to the user;

responsive to finding a prospect, automatically querying third-party databases through corresponding third-party application programming interfaces (APIs), collecting third-party data about the prospect from the third-party databases, and storing the third-party data in the tiered software framework;

retrieving historical data associated with all accounts in the tiered software framework;

identifying criteria from the historical data, the criteria indicative of conversion of prospects to customers and relevant to the user based on information in the user's account; and analyzing the stored third-party data about the prospect according to the identified criteria to generate analysis results;

responsive to generating the analysis results, transforming, by a data visualizer in the second computing device, a subset of the analysis results into a first report comprising an array of rows and columns, wherein:

the subset is selected based on criteria of interest to the user as determined from information in the user's account, and the prospect is listed in one of the rows and the subset of the analysis results is listed as icons in the corresponding columns;

displaying the first report in a first window of the UI in the first computing device, wherein the displaying causes the rows in the array to be selectable with a second UI element;

responsive to the user selecting the prospect in the first report with the second UI element, transforming, by the data visualizer in the second computing device, the analysis results into a second report;

displaying the second report in a second window of the UI in the first computing device, wherein the displaying causes a portion of the analysis results to be hidden but selectable with a third UI element; and responsive to the user selecting the hidden portion with the third UI element, causing the hidden portion to be visible in the UI in the first computing device.

10. The non-transitory computer-readable tangible media of claim 9, wherein the third-party data comprises:
telephone numbers of the prospect;
source codes of websites of the prospect;
third-party marketing channels used by the prospect;
social media data of the prospect; and
publicly available business data of the prospect.

11. The non-transitory computer-readable tangible media of claim 10, wherein one of the third-party databases comprises a telephone provider, and the operations further comprise:
identifying whether a telephone number of the prospect is text-enabled, wherein having a text-enabled phone number is one of the criteria;
responsive to determining that the telephone number of the prospect is text-enabled, displaying the corresponding analysis result in the first report as a first icon; and
responsive to determining that the telephone number of the prospect is not text-enabled, displaying the corresponding analysis result in the first report as a second icon.

12. The non-transitory computer-readable tangible media of claim 10, wherein the operations further comprise:
analyzing the source code of a website to identify a website platform of the website;
comparing the identified website platform with a particular website platform;
responsive to determining that the identified website platform is the particular website platform, marking the website as not relevant, and displaying the corresponding analysis result in the first report as a first icon; and
responsive to determining that the identified website platform is not the particular website platform, marking the website as relevant, and displaying the corresponding analysis result in the first report as a second icon.

13. The non-transitory computer-readable tangible media of claim 10, wherein the operations further comprise:
analyzing a third-party marketing channel to determine whether the prospect is using the third-party marketing channel;
responsive to determining that the prospect is using the third-party marketing channel, marking a claim status of the prospect as claimed, and displaying a corresponding analysis result in the first report as a first icon; and
responsive to determining that the prospect is not using the third-party marketing channel, marking the claim status of the prospect as not claimed, and reducing a corresponding analysis result in the first report as a second icon.

14. The non-transitory computer-readable tangible media of claim 10, wherein:

the criteria comprise:
a number of social media reviews;
a frequency of responses to the social media reviews;
a number of positive social media reviews; and
a number of negative social media reviews,
the third-party databases comprise social media sites, and
the operations further comprise:
analyzing social media data of the prospect from the social media sites against the criteria to calculate a rating; and
displaying the corresponding analysis result in the first report as an icon representative of the calculated rating.

15. An apparatus comprising:
a processing circuitry;
a memory storing data; and
a communication circuitry, wherein the processing circuitry executes instructions associated with the data, the processing circuitry is coupled to the communication circuitry and the memory, and the processing circuitry and the memory cooperate, such that the apparatus is configured for:
providing a user interface (UI) in another apparatus, the UI comprising a first UI element selectable by a user associated with an account in a tiered software framework;
responsive to the user selecting the first UI element, performing operations in the apparatus, the operations comprising:
automatically searching external networks for prospects of interest to the user;
responsive to finding a prospect, automatically querying third-party databases through corresponding third-party application programming interfaces (APIs), collecting third-party data about the prospect from the third-party databases, and storing the third-party data in the tiered software framework;
retrieving historical data associated with all accounts in the tiered software framework;
identifying criteria from the historical data, the criteria indicative of conversion of prospects to customers and relevant to the user based on information in the user's account; and
analyzing the stored third-party data about the prospect according to the identified criteria to generate analysis results;
responsive to generating the analysis results, transforming, by a data visualizer in the apparatus,
a subset of the analysis results into a first report comprising an array of rows and columns,
wherein:
the subset is selected based on criteria of interest to the user as determined from information in the user's account, and
the prospect is listed in one of the rows and the subset of the analysis results is listed as icons in the corresponding columns;
displaying the first report in a first window of the UI in the another apparatus, wherein the displaying causes the rows in the array to be selectable with a second UI element;
responsive to the user selecting the prospect in the first report with the second UI element, transforming, by the data visualizer in the apparatus, the analysis results into a second report;

displaying the second report in a second window of the UI in the another apparatus, wherein the displaying causes a portion of the analysis results to be hidden but selectable with a third UI element; and responsive to the user selecting the hidden portion with the third UI element, causing the hidden portion to be visible in the UI in the another apparatus.

16. The apparatus of claim 15, wherein the third-party data comprises:
telephone numbers of the prospect;
source codes of websites of the prospect;
third-party marketing channels used by the prospect;
social media data of the prospect; and
publicly available business data of the prospect.

17. The apparatus of claim 15, wherein:
the first UI element is a selectable button,
the second UI element is a selectable hyperlink, and
the third UI element is a drill-down button.

18. The apparatus of claim 15, wherein the user's interest is determined from a search query input by the user in a search field in the UI.

19. The apparatus of claim 15, wherein:
the second report comprises a plurality of sections, and
each section is presented in a different format selected from pictures, numbers, text, and icons.

20. The apparatus of claim 19, wherein the hidden portion is represented by one of the pictures or icons, and the apparatus is further configured for: responsive to selecting the one of the pictures or icons with the third UI element, displaying corresponding analysis results in the second report as numbers or text.

\* \* \* \* \*